(12) United States Patent
Wachi

(10) Patent No.: US 7,527,684 B2
(45) Date of Patent: May 5, 2009

(54) INK SET AND INK JET RECORDING METHOD

(75) Inventor: Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 129 days.

(21) Appl. No.: 11/631,942

(22) PCT Filed: Jul. 11, 2005

(86) PCT No.: PCT/JP2005/013192

§ 371 (c)(1),
(2), (4) Date: Jan. 9, 2007

(87) PCT Pub. No.: WO2006/006703

PCT Pub. Date: Jan. 19, 2006

(65) Prior Publication Data

US 2008/0043078 A1    Feb. 21, 2008

(30) Foreign Application Priority Data

Jul. 13, 2004   (JP)   ............................. 2004-206514
Jul. 13, 2004   (JP)   ............................. 2004-206517

(51) Int. Cl.
C09D 11/00    (2006.01)
C09D 11/02    (2006.01)
B41J 2/01     (2006.01)

(52) U.S. Cl. .............. 106/31.52; 106/31.48; 106/31.49; 106/31.5; 106/31.58; 347/100

(58) Field of Classification Search .............. 106/31.27, 106/31.49, 31.46, 31.48, 31.52, 31.5, 31.58, 106/31.59; 347/100
See application file for complete search history.

(56) References Cited

U.S. PATENT DOCUMENTS

| 4,818,285 | A  |  4/1989 | Causley et al. |  |
|---|---|---|---|---|
| 6,521,030 | B1 |  2/2003 | Stoffel |  |
| 7,029,523 | B2* |  4/2006 | Taguchi et al. | 106/31.46 |
| 7,037,365 | B2* |  5/2006 | Taguchi et al. | 106/31.46 |
| 7,048,790 | B2* |  5/2006 | Taguchi et al. | 106/31.46 |
| 7,211,133 | B2* |  5/2007 | Taguchi | 106/31.48 |
| 7,267,715 | B2* |  9/2007 | Taguchi et al. | 106/31.48 |
| 7,303,272 | B2* | 12/2007 | Taguchi et al. | 347/100 |
| 2004/0154496 | A1* |  8/2004 | Taguchi | 106/31.48 |
| 2004/0187736 | A1 |  9/2004 | Taguchi et al. |  |
| 2004/0194659 | A1 | 10/2004 | Taguchi |  |
| 2007/0101899 | A1* |  5/2007 | Taguchi et al. | 106/31.27 |
| 2007/0139499 | A1* |  6/2007 | Yabuki et al. | 347/100 |
| 2007/0240608 | A1* | 10/2007 | Ogawa | 106/31.52 |
| 2007/0266890 | A1* | 11/2007 | Taguchi et al. | 106/31.47 |
| 2008/0043079 | A1* |  2/2008 | Ikeda et al. | 347/100 |

FOREIGN PATENT DOCUMENTS

| EP | 1 340 796 A1 | 9/2003 |
|---|---|---|
| JP | 8-302255 A | 11/1996 |
| JP | 2000-327965 A | 11/2000 |
| JP | 2001-106946 A | 4/2001 |
| JP | 2002-080766 A | 3/2002 |
| JP | 2003-238863 A | 8/2003 |
| JP | 2004-307832 A | 11/2004 |
| JP | 2004-307858 A | 11/2004 |
| JP | 2004-331699 A | 11/2004 |
| JP | 2005-36164 A | 2/2005 |
| WO | WO 97/16496 A1 | 5/1997 |
| WO | WO 2005/121261 | * 12/2005 |

OTHER PUBLICATIONS

Database WPI Week 200501. Derwent Publications Ltd., London, GB; AN 2005-002883, XP002437372 & JP 2004 331699 A abstract, Nov. 2004.

* cited by examiner

*Primary Examiner*—Helene Klemanski
(74) *Attorney, Agent, or Firm*—Sughrue Mion, PLLC

(57) ABSTRACT

An ink set comprising a yellow ink containing at least one yellow dye, a magenta ink containing at least one magenta dye, a cyan ink containing at least one cyan dye and a black ink containing at least two kinds of dyes as a minimum constituent element, in which an oxidation potential for each of the yellow dye, the magenta dye and the cyan dye is more electropositive than 0.8 V (vs SCE) and/or each of the inks is an azo dye containing at least one heterocyclic ring in a molecule or a phthalocyanine dye containing at least one heterocyclic ring in a molecule, and the black ink contains a water soluble long wavelength dye L and a water soluble short wavelength dye S having three or more azo groups in one molecule and having a naphthalene skeleton, and a ink jet recording method utilizing the ink set.

19 Claims, No Drawings

INK SET AND INK JET RECORDING METHOD

TECHNICAL FIELD

The present invention concerns an ink set excellent in image fastness, and an ink jet recording method using the ink set.

BACKGROUND ART

In recent years, as image recording materials, materials particularly for forming color images are predominant and, specifically, recording materials for ink jet systems, recording materials for heat transfer type images, recording materials using electrophotographic systems, silver halide light sensitive materials for transfer type, printing inks and recording pens have been utilized popularity.

In the color image recording materials described above, while coloring materials (dyes or pigments) of three primary colors for so-called subtractive color mixing system have been used for reproducing or recording full color images, coloring materials having absorption characteristics capable of attaining preferred color reproducing regions and which are fast being endurable to various working conditions have not been yet available at present and improvement therefore has been demanded strongly.

Since an ink jet recording method is inexpensive in the material cost, can conduct high speed recording, generates less noises during recording and, further, can conduct color recording easily, the method has been rapidly popularized and has been now under further development.

The ink jet recording method includes a continuous system of flying liquid droplets continuously and an on-demand system of flying liquid droplets in accordance with image information signals, and the ejection system includes a system of applying a pressure by a piezo-element thereby discharging liquid droplets, a system of generating bubbles in an ink by heat thereby discharging liquid droplets, a system of using supersonic waves, or a system of attracting and discharging liquid droplets by electrostatic force. Further, for the ink jet recording ink, an aqueous ink, an oily ink or a solid (hot-melt type) ink is used.

The colorant used for the ink for use in jet recording described above is required that it has good solubility or dispersibility to a solvent, can conduct high density recording, has good hue, fastness to light, heat and active gases in the circumstance (oxidative gas such as NOx and ozone, as well as SOx), has excellent fastness to water or chemicals, good fixing property to image receiving materials with less blur, excellent storability as ink, no toxicity, and high purity and, further, it is available at a reduced cost. However, it is extremely difficult to obtain a colorant capable of satisfying the requirements described above at high level. Particularly, it has been strongly demanded for the colorant that it has favorable hue of three primary colors and is fast to light, humidity and heat and, among all, it is fast to oxidative gases such as ozone in the circumstance upon printing on an image receiving material having an ink receiving layer containing porous inorganic white pigment particles.

Heretofore, azo dyes using phenol, naphthol, aniline, etc. as the coupling ingredient have been used generally as the magenta dye. As azo dyes of favorable hue, those dyes disclosed, for example, in JP-A No. 11-209673 and JP No. 3020660 have been known but they involve a problem of poor light fastness. For improving the problem, dyes having favorable hue and improved with light fastness are disclosed in JP-A No. 2001-335714. However, dyes known in the patent documents described above are extremely poor in view of the fastness to oxidative gases such as ozone.

Further, phthalocyanine dyes and triphenylmethane dyes are typical as cyan dyes.

The phthalocyanine dyes used most generally are typically represented by C.I. Direct Blue 86, 87, and 199 and they have a feature more excellent in the light fastness compared with magenta or yellow dyes. However, they suffer from remarkable change of color or discoloration by oxidative gases such as nitrogen oxide gas or ozone which have often been taken up in view of environmental problems recently.

While JP-A Nos. 3-103484, 4-39365 and 2000-30309, etc. disclose phthalocyanine dyes provided with ozone gas resistance but the effect of improving the fastness to the oxidative gas is extremely insufficient in any of them and a further improvement has been demanded.

On the other hand, while triphenylmethane dyes represented by Acid Blue 9 show favorable hue, they are remarkably poor in the light fastness and ozone gas fastness.

As the yellow dye, azo benzene dyes as represented by Direct Yellow 86 and 120, or heterocyclic ring azo dyes such as pyrazolone azo dye and pyridone azo dye such as Acid Yellow 17 have been used. Further, quinophthalone type dyes have also been often proposed. However, in the dyes known so far, those dyes showing favorable hue and, particularly, sharp cut off on the side of long waves of the absorption spectrum such as quinophthalone dye are often not fast to ozone or light, whereas azo benzene dyes show poor cut off on the side of long waves although favorable in the fastness, and dyes favorable both in the hue and the fastness are not available at present.

Heretofore, while disazo dyes or trisazo dyes have been used for the black dye, since absorption to blue to green light is often insufficient by the use of the dye described above alone, thereby often failing to obtain a good black tone, a color compensation dye for absorbing such blue to green light is generally used together. As the compensation dye, those dyes described, for example, in JP-A No. 9-255906 and JP No. 3178200 specification are proposed and improvement has been attempted for black tone controllability, color forming property, fastness, ink store stability, water proofness and clogging of nozzles.

However, the color compensation dyes proposed so far involve a problem of lacking in the black tone controllability such that a great amount of addition is required because the absorption wavelength is excessively short or other color compensation dye is further required.

Further, while dyes capable of absorbing blue to green lights have generally been known, most of them undergo remarkable change of hue when exposed to light, heat and active gases in the circumstance because of poor fastness, or cause a phenomenon such as yellow blur at the profile portion under high humidity condition because of insufficient fixing property and, further improvement is necessary.

In view of the drawbacks described above, JP-A No. 2002-332426 describes a black ink composition in which a triazine dye having an absorption maximum in a visible region absorption spectrum at 435 nm in an aqueous solvent is blended as a color compensation dye with a black dye.

However, general black dyes have maximum absorption at 570 to 620 nm, and it is apparent that no preferred black tone can be obtained even when the color compensation dye is used in view of the complementary color relation, which is important for the control of the black tone ("Color Science Handbook (second edition)" from University of Tokyo Press, 1998, p560-562).

While JP-A No. 8-302255 describes C.I. Direct Red 84, it does not disclose a black ink composition of combining the same as a short wavelength dye with a long wavelength dye.

JP-A No. 2000-265099 describes C.I. Direct Red 84 in column 8 but this is magenta and it does not disclose a black ink composition using the same as a short wavelength dye in combination with a long wavelength dye.

For obtaining full color images of excellent color reproducibility and having fastness, the following conditions are required for the dye constituting the images:
(1) each of the dyes for three primary colors and black has excellent absorption characteristic,
(2) optimal combination of dyes of three primary colors and black that attains a wide color reproducing region,
(3) each of dyes of three primary colors and black has high fastness,
(4) fastness is not worsened by interaction between dyes,
(5) fastness is balanced between dyes of three primary colors and black.

However, since there are no reports at all regarding the fastness, particularly, the fastness to oxidative gases such as ozone that gives rise to a significant problem in ink jet printing recently, as to what structure or physical property act effectively to the ozone fastness, no guideline for selecting the dyes can be obtained at present. Furthermore, in a case of selecting those having light fastness together, the difficulty is further increased.

DISCLOSURE OF THE INVENTION

An object of the present invention which has been achieved in view of the drawbacks in the related art is to give a guideline for the improvement capable of drastically overcoming the gas discoloration in common with various dyes, provide an ink set for use in ink jet recording capable of forming images excellent in the fastness to gases (particularly, ozone gas) and fastness to light that can by the use of an ink composition based on the guideline described above, as well as provide an ink jet recording method using the ink set, and a method of preventing discoloration of ink jet recording images.

The present inventors have studied specifically on a dye showing favorable hue and high light fastness and fastness to gas (particularly, ozone gas), have found that the problem can be overcome by the combination of dyes having specified oxidation potential not known so far, and have accomplished the invention. That is, it has been found that when the three primary color dyes satisfy the potential characteristic described above, this not only suppresses the reactivity of each of the dyes to ozone greatly but also improves the light fastness, and results in no problem of discoloration in the color mixed portion with no interaction between each of dyes of different colors. On the contrary, in a case, particularly, of using a magenta dye or cyanine dye that does not satisfy the condition of the potential, it has been found that the balance for the entire images is lost significantly to greatly deteriorate the quality as the full color images. Further, also in a case of using inks of different densities that have been used recently in order to improve the color reproducibility, it has been found that this does not give rise to a problem also in the light fastness of a pale color ink. Further, since the stability of the dye itself is improved, the oxidation stability of the ink can also be improved to prolong the guarantee period as the product.

The yellow ink, the magenta ink, the cyan ink of the invention each comprises a dye with an oxidation potential provision in which an oxidation potential is more electropositive than 0.8 V (vs SCE), or comprises an azo dye or a phthalocyanine dye with a structural provision in which the dye contains at least one heterocyclic ring in the molecule, wherein the dye preferably satisfies the both the oxidation potential provision and the structural provision.

That is, preferred embodiments for solving the subject include the followings:

(1) An ink set comprising:
an yellow ink;
a magenta ink;
a cyan ink; and
a black ink, in which at least one of the inks is an ink containing at least one dye in an aqueous medium,
wherein each of the yellow ink, the magenta ink and the cyan ink is an ink containing at least one dye having an oxidation potential of more electropositive than 0.8 V (vs Saturated Calomel Electrode), and the black ink contains: a water soluble long wavelength dye L; and a water soluble short wavelength dye S that has three or more azo groups in one molecule and a naphthalene skeleton.

(2) An ink set comprising:
an yellow ink;
a magenta ink;
a cyan ink; and
a black ink, in which at least one of the inks is an ink containing at least one dye in an aqueous medium,
wherein each of the yellow ink, the magenta ink and the cyan ink is an azo dye containing at least one heterocyclic ring in a molecule or a phthalocyanine dye containing at least one heterocyclic ring in a molecule, and the black ink contains: a water soluble long wavelength dye L; and a water soluble short wavelength dye S that has three or more azo groups in one molecule and having a naphthalene skeleton.

(3) The ink set as described in (1) or (2) above,
wherein the water soluble long wavelength dye L has a maximum absorption spectrum of 550 to 700 nm and a half-value width of 100 nm or more in an aqueous medium, and the water soluble short wavelength dye S has a maximum absorption spectrum of 440 to 540 nm and a half-value width of 90 to 200 nm in an aqueous medium.

(4) The ink set as described in any of (1) to (3) above,
wherein the water soluble short wavelength dye S has 3 to 6 azo groups in one molecule and does not have a phenolic hydroxyl group.

(5) The ink set as described in any of (1) to (4) above,
wherein the water soluble short wavelength dye S contains C.I. Direct Red 84.

(6) The ink set as described in any of (1) to (5) above,
wherein the black ink contains the water soluble short wavelength dye S in an amount of from 0.1 to 4 mass %.

(7) The ink set as described in any of (1) to (6) above,
wherein the water soluble long wavelength dye L has 2 to 4 azo groups conjugated to each other in one molecule.

(8) The ink set as described in any of (1) to (7) above,
wherein the water soluble long wavelength dye L has a hydroxyl group at a conjugation position of the azo group.

(9) The ink set as described in any of (1) to (8) above,
wherein the water soluble long wavelength dye L has one or less heterocyclic ring in a color forming group.

(10) The ink set as described in any of (1) to (9) above,
wherein the water soluble long wavelength dye L has an associative property.

(11) The ink set as described in any of (1) to (10) above,
wherein the aqueous medium has a vapor pressure of 2000 Pa or less.

(12) The ink set as described in any of (1) to (11) above, wherein the aqueous medium is one or more member selected from the group consisting of alcohol compound, heterocyclic ring-containing organic solvent and alkyl ether of polyhydric alcohol.

(13) The ink set as described in any of (1) to (12) above, which contains one or more aqueous media selected from diethylene glycol, triethylene glycol, glycerine, triethylene glycol monobutyl ether, 1,5-pentanediol, 1,2-hexanediol, isopropanol, triethanolamine and 2-pyrrolidone.

(14) The ink set as described in any of (1) to (13) above, wherein at least one of the inks contains a surfactant.

(15) The ink set as described in any of (1) to (14) above, wherein at least one of the inks contains a corrosion inhibitor.

(16) The ink set as described in any of (1) to (15) above, wherein at least one of the inks has a viscosity of from 1 to 20 mPa·sec.

(17) The ink set as described in any of (1) to (16) above, wherein at least one of the inks has a surface tension of from 20 to 50 mN/m.

(18) The ink set as described in any of (1) to (17) above, wherein at least one of the inks has a pH of from 7 to 9.

(19) An ink jet recording method, which comprises forming an image on an image receiving material having an ink receiving layer containing white pigment particles on a support by utilizing an ink set as described in any of (1) to (18) above.

(20) An ink set as described in any of (1) to (18) above, wherein the magenta ink contains a magenta dye represented by formula (M-I):

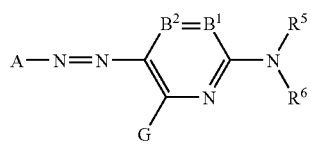

Formula (M-I)

wherein A represents a residue of a 5-membered heterocyclic ring diazo ingredient A-$NH_2$;

$B^1$ and $B^2$ each represents —$CR^1$= and —$CR^2$=, or one of $B^1$ and $B^2$ represents a nitrogen atom and the other of $B^1$ and $B^2$ represents —$CR^1$= or —$CR^2$=;

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkyl- or an aryl-sulfonyl group or a sulfamoyl group in which each group may further have substituent;

G, $R^1$, and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclicoxy carbonyl group, an acyl group, a hydroxyl group, an alkoxy group, an aryloxy group, a heterocyclicoxy group, a silyloxy group, an acyloxy group, a carbamoyloxy group, an alkoxycarbonyloxy group, an aryloxycarbonyloxy group, an amino group (including a heterocyclicamino group and an anilino group), an acylamino group, an ureido group, a sulfamoylamino group, an alkoxycarbonylamino group, an aryloxyarbonylamiono group, an alkyl- or an aryl-sulfonylamino group, a heterocyclicsulfonylamino group, a nitro group, an alkyl- or an aryl-thio group, an alkyl-or an aryl-sulfonyl group, a heterocyclic sulfonyl group, an alkyl- or an aryl-sulfinyl group, a heterocyclic sulfinyl group, a sulfamoyl group, a sulfo group or a heterocyclic thio group, in which each group may be further substituted; and $R^1$ and $R^5$ or $R^5$ and $R^6$ may join to each other to form a 5- or 6-membered ring.

(21) An ink set as described in any of (1) to (18) and (20) above, wherein the cyan ink contains a cyan dye represented by formula (C-II):

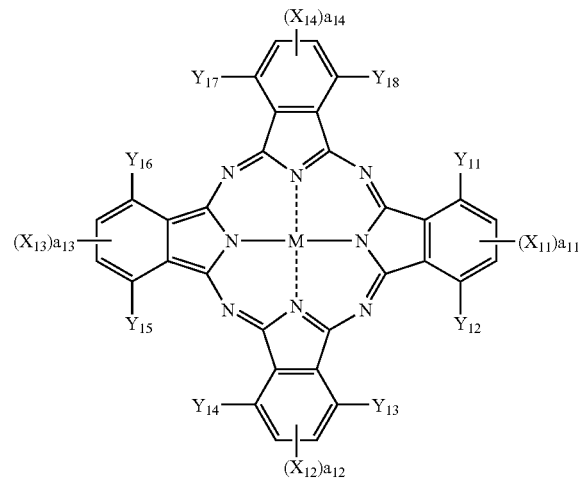

Formula (C - II)

wherein $X_{11}$, $X_{12}$, $X_{13}$, and $X_{14}$ each independently represents an electron attracting group with σp of 0.40 or more;

$Y_{11}$, $Y_{12}$, $Y_{13}$, and $Y_{14}$ each independently represents a monovalent substituent;

M represents a hydrogen atom, a metal element or an oxide thereof, a hydroxide thereof or a halide thereof;

$a_{11}$ to $a_{14}$, and $b_{11}$ to $b_{14}$ each represents a number of substituents of $X_{11}$ to $X_{14}$ and $Y_{11}$ to $Y_{14}$ respectively;

$a_{11}$ to $a_{14}$ each independently represents an integer of 0 to 4 and $b_{11}$ to $b_{14}$ each independently represents an integer of 0 to 4, and a total for $a_{11}$ to $a_{14}$ is 2 or more, and wherein when the dye is a water soluble dye, an ionic hydrophilic group is further present as a substituent at any position on $X_{11}$, $X_{12}$, $X_{13}$, $X_{14}$, and $Y_{11}$, $Y_{12}$, $Y_{13}$, and $Y_{14}$.

(22) An ink set for ink jet recording as described in any of (1) to (18) and (20) to (21) above, wherein an oxidation potential of the magenta dye is more electropositive than an oxidation potential of the cyan dye.

(23) The ink set for ink jet recording as described in any of (1) to (18) and (20) to (22) above, wherein at least the magenta ink and the cyan ink each comprises two or more kinds of inks of different concentrations.

(24) A container housing an ink set for ink jet recording as described in any of (1) to (18) and (20) to (23) above.

(25) A method of preventing a discoloration of an ink jet recording image, wherein an ink jet recording is conducted by utilizing an ink set according to any (1) to (18) and (20) to (23) above.

BEST MODE FOR CARRYING OUT THE INVENTION

The present invention is to be described specifically.

Yellow Dye, Magenta Dye, Cyan Dye

In the invention, an yellow dye, magenta dye, and cyan dye with the oxidation potential of more electropositive than 0.8 V (vs SCE) are used. It is preferred that the oxidation potential is more electropositive and those with oxidation potential of more electropositive than 1.0 V (vs SCE) are more preferred, those with oxidation potential of more electropositive than 1.1 V (vs SCE) are further preferred, those with oxidation potential of more electropositive than 1.15 V (vs SCE) are further more preferred, and those with oxidation potential of more electropositive than 1.2 V (vs SCE) are most preferred.

The value for the oxidation potential represents the transferability of electrons from the specimen to the electrode and a larger value (more electropositive oxidation potential) shows less transferability of the electron from the specimen to the electrode, that is, less oxidizability. In relation with the structure of the compound, the oxidation potential becomes more electropositive by the introduction of an electron attracting group and the oxidation potential become more electronegative by the introduction of an electron donating group.

The value for the oxidation potential, while being described specifically below, means the potential at which an electron of a compound is withdrawn at an anode in the voltammetry of the compound and it is considered that this approximately agrees with HOMO energy level in the ground state of the compound.

As a result of the study made by the inventors on the ozone fastness of colored images, it has been found that there is a correlation between the oxidation potential of the compound used for colored images and the ozone fastness, and the ozone fastness is improved by the use of a compound having the value of oxidation potential more electropositive relative to the saturated calomel electrode (SCE).

The reason why the ozone fastness of the colored images is improved can be explained based on the relation between the HOMO (highest occupied molecular orbital) and LUMO (lowest unoccupied molecular orbital) of the compound and the ozone gas. That is, since it is considered that the coloring agent is oxidized by the reaction of HOMO of the coloring agent and LUMO of the ozone gas to result in deterioration of the ozone fastness of the colored images, the ozone fastness can be improved by lowering HOMO of the colorant to lower the reactivity with the ozone gas.

The value for oxidation potential (Eox) can be measured easily by those skilled in the art. The method is described, for example, in "New Instrumental Methods in Electron Chemistry", written by P. Delahay (Interscience Publishers in 1954), "Electrochemical Methods", written by A. J. Bard, et al. (John Wiley & Sons in 1980), and "Electrochemical Measuring Method" written by Akira Fujishima, et al. (Gihodo Shuppansha, 1984).

Measurement for the oxidation potential is to be described specifically. The oxidation potential is measured by dissolving a test specimen by $1 \times 10^{-2}$ to $1 \times 10^{-6}$ mol·dm$^{-3}$ in a solvent such as of dimethylformamide or acetonitrile including a support electrolyte such as sodium perchlorate or tetrapropyl ammonium perchlorate as a value to SCE (Saturated Calomel Electrode) by using cyclic voltammetry.

Further, the support electrolyte or the solvent to be used can be selected properly depending on the oxidation potential and the solubility of the test specimen. The support electrolyte and the solvent that can be used are described in "Electrochemical Measuring Method", written by Akira Fujishima, et al. (Published in 1984 from Gihodo Shuppansha), 101 to 118 pp.

While the value of the oxidation potential may sometimes be deviated by about several tens mV under the effect, for example, of inter-liquid potential difference or the liquid resistance of the specimen solution, the reproducibility for the measured potential value can be ensured by calibration using a standard specimen (for example, hydroquinone).

As the oxidation potential in the invention, a value measured in N,N-dimethylformamide containing 0.1 mol·dm$^{-3}$ of tetrapropyl ammonium perchlorate as a support electrolyte (compound concentration at $1 \times 10^{-3}$ mol·dm$^{-3}$), by DC polarography using SCE (Saturated Calomel Electrode) as a reference electrode, a graphite electrode as a working electrode, and a platinum electrode as a counter electrode.

As the dye used in the invention, those of any structure can be used so long as the oxidation potential described above is satisfied. Particularly, since the yellow dye has an electropositive oxidation potential (low HOMO) by nature, it suffers from less restriction in view of the structure. The structure of the dye necessary for satisfying the oxidation potential is to be described specifically.

In the invention, for lowering the reactivity with ozone as an electronphilic agent, it is desirable to introduce an electron attracting group to a dye skeleton thereby making the oxidation potential more electropositive. Accordingly, referring to this by using the Hammett's substituent constant σp value as a measure for the electron attracting property and the electron donating property of the substituent, it can be said that the oxidation potential can be made more electropositive by introducing a substituent with a large σp value such as a nitro group, cyano group, sulfinyl group, sulfonyl group or sulfamoyl group.

Description is to be made briefly for the Hammett's substituent constant σp value. The Hammett's law is an empirical rule proposed by L. P. Hammett in 1935 for quantitatively discussing the effect of the substituent on the reaction or equilibrium of benzene derivatives, which is generally considered valid at present. The substituent constant determined according to the Hammett's law includes σp value and σm value, and such values are found in general books. For example, they are detailed in "Lange's Handbook of Chemistry" edited by J. A. Dean, 12th edition, 1979 (McGraw-Hill) or in "Region of Chemistry", extra number, No. 122, pp 96 to 103, 1979 (Nankodo).

Generally, the oxidation potential can be rendered more electropositive as more atoms of high electron negativity is contained as constituent atoms for the color forming group in addition to the substituents described above. Accordingly, the oxidation potential can be rendered more electropositive in a case of using an unsaturated heterocyclic ring than in a case of using an aryl group as the constituent factor for the color forming group. Hetero atoms of higher electron negativity can include nitrogen atom, oxygen atom and sulfur atom, the nitrogen atom being particularly preferred.

Accordingly, for the dyes to be used in the invention, those in which the color forming group comprises hetero atoms, those containing an unsaturated heterocyclic ring, or those containing electron attracting group are preferred.

Preferred color forming group constituted with the hetero atoms can include azo dyes, azo methine dyes, phthalocyanine dyes, etc. with the azo dye being particularly preferred.

As the unsaturated heterocyclic ring, 5- or 6-membered unsaturated heterocyclic rings is preferred and includes, for example, thiophene ring, furan ring, pyrrole ring, thiazole ring, oxazole ring, imidazole ring, isothiazole ring, isooxazole ring, pyrazole ring, thiadiazole ring, oxodiazole ring, triazole ring, pyridine ring, pyridazine ring, pyrimidine ring, and pyrazine ring. The unsaturated heterocyclic ring may form a condensed ring with a hydrocarbon ring or heterocyclic ring. In a case of the nitrogen-containing heterocyclic ring, the nitrogen atoms may be quaternarized. Further, for the heterocyclic ring which can be a tautomeric isomer, a tautomeric isomer, even when only one form is described, may also contain another tautomeric isomer together. Among them, preferred are a thiazole ring, isothiazole ring, pyrazole ring, thiadiazole ring, pyridine ring, pyrimidine ring, and pyrazine ring. Most preferred are isothiazole ring, pyrazole ring, 1,2,4-thiadiazole ring, 1,3,4-thiadiazole ring, and pyridine ring.

As the preferred electron attracting substituent, a substituent with the Hammett's σp value of 0.40 or more is preferred, a substituent with the value of 0.45 or more is more preferred and, a substituent with the value of 0.50 or more is most preferred. Further, in a case where a plurality of electron attracting groups are present as the substituents on the color forming group, the total for the σp values of the substituents is preferably 0.50 or more, more preferably, 0.60 or more and, most preferably, 0.70 or more. Specific examples of the electron attracting group with σp of 0.40 or more can be mentioned as those described in "Lange's Handbook of Chemistry" edited by J. A. Dean, 12th edition, 1979 (MaGrow-Hill) or "Region of Chemistry", extra number, No. 122, pp 96 to 103, in 1979 (Nankodo).

A preferred dye of the invention in a combination represented by the following general formula (I):

(Ch)-(EWG)$_n$     formula (I)

In the general formula (I), Ch represents a color forming group containing an unsaturated heterocyclic ring and EWG represents an electron attracting substituent with the σp value of 0.40 or more. n is integer of from 1 to 8.

Ch includes each of color forming groups of azo dye, phthalocyanine dye, azomethine dye, quinone dye (anthraquinone dye, anthrapyridone dye, etc.), carbonium dye (triphenyl methane dye, xanthene dye, acridine dye, etc.) and azine dye (oxazine, thiazine, etc.) having an unsaturated hetero group to the color forming group. Preferred are azo dye, phthalocyanine dye, azomethine dye, and anthrapyridone dye having the unsaturated heterocyclic ring to the color forming group and most preferred are azo dye and phthalocyanine dye having the unsaturated heterocyclic ring to the color forming group.

Preferred azo dyes that can be used as the magenta and yellow dyes are those represented by the following general formula (II).

Het(A)-N=N-Het(B)     formula (II)

In the general formula (II), Het(A) and Het(B) each represents a 5- or 6-membered unsaturated heterocyclic ring. Examples of the unsaturated heterocyclic ring represented by Het(A) and Het(B) include, for example, thiophene ring, furan ring, pyrrole ring, thiazole ring, oxazole ring, imidazole ring, isothiazole ring, isooxazole ring, pyrazole ring, thiadiazole ring, oxadiazole ring, triazole ring, pyridine ring, pyridazine ring, pyrimidine ring, and pyradine ring. The unsaturated heterocyclic rings further have a substituent. Substituents on the unsaturated heterocyclic ring may join to each other to form a condensed ring with a hydrocarbon ring or an unsaturated heterocyclic ring and, further, they may have a substituent on the condensed ring. In a case of a nitrogen-containing unsaturated heterocyclic ring, the nitrogen atom may be quaternarized. Further, the unsaturated heterocyclic ring which can be tautomeric isomers, also includes even when only one of tautomeric isomers is described, also contain another tautomeric isomer together.

In a case where the dye is a water soluble dye, it is preferred that an ionic hydrophilic group is present further as the substituent. The ionic hydrophilic group as the substituent includes sulfo group, carboxyl group, phosphono group, quaternary ammonium group, etc.

The heterocyclic ring represented by Het(A) or Het(B) are preferably a thiazole ring, isothiazole ring, pyrazole ring, thiadiazole ring, pyridine ring, and pyrazine ring. More preferred are isothiazole ring, pyrazole ring, thiadiazole ring, and pyridine ring. Most preferred are pyrazole ring 1,2,4-thiadiazole ring, and pyridine ring.

Het(A) and Het(B) may have a substituent. The substituent include those substituents such as halogen atom, alkyl group (including cycloalkyl group), alkenyl group (including cycloalkenyl group), alkynyl group, aryl group, heterocyclic group, cyano group, hydroxyl group, nitro group, carboxyl group, alkoxy group, aryloxy group, silyloxy group, heterocyclicoxy group, acyloxy group, carbamoyloxy group, alkoxycarbonyloxy group, aryloxycarbonyloxy group, amino group (including anilino group), acylamino group, aminocarbonylamino group, alkoxycarbonylamino group, aryloxycarbonylamino group, sulfamoylamino group, alkyl and arylsulfonylamino group, mercapto group, alkylthio group, arylthio group, heterocyclicthio group, sulfamoyl group, sulfo group, alkyl and arylsulfinyl group, alkyl and arylsulfonyl group, acyl group, aryloxycarbonyl group, alkoxycarbonyl group, carbamoyl group, aryl and heterocyclicazo group, imide group, phosphino group, phosphono group, phosphinyl group, phosphinyloxy group, phosphinylamino group, and silyl group. They include, among all, halogen atom, heterocyclic group, cyano group, nitro group, carboxyl group, acyloxy group, carbamoyloxy group, alkoxycarbonyloxy group, aryloxycarbonyloxy group, sulfamoyl group, sulfo group, alkyl and arylsulfinyl group, alkyl and arylsulfonyl group, acyl group, aryloxycxarbonyl group, alkoxycarbonyl group, carbamoyl group, imide group, phosphoryl group, phosphono group, phosphinoyl group, phosphonyl group, phosphinoyloxy group, and phosphinoylamino group. Among all, the electron attracting group is preferred and, particularly, a substituent with σp of 0.40 or more is preferred. The substituent with σp of 0.40 or more includes cyano group, nitro group, carboxyl group, sulfamoyl group, alkyl and arylsulfinyl group, alkyl and arylsulfonyl group, acyl group, aryloxycarbonyl group, alkoxycarbonyl group, carbamoyl group, imide group, phosphono group, and phosphoryl group, as well as alkyl group substituted with an electron attracting group (trihalomethyl group, perfluoroalkyl group, dicyanomethyl group, and iminomethyl group), alkenyl group substituted with an electron attracting group (for example, tricyanovinyl group), a quaternary salt substituted group (sulfonium group, ammonium group, and phosphonium group). Among the functional groups, those having a hydrogen atom, may be removed with the hydrogen atom and further substituted with the group described above. Such substituent can include, for example, alkylcarbonylaminosulfonyl group, arylcarbonylaminosulfonyl group, alkylsulfonylaminocarbonyl group, and arylsulfonylaminocarbonyl group.

Further, substituents on the heterocyclic ring may join with each other to form a condensed ring with the heterocyclic ring or further have a substituent on the condensed ring.

Preferred magenta dyes are those represented by the general formula (M-I). In the general formula (M-I), A represents a residue of 5-membered heterocyclic ring diazo ingredient A-NH$_2$. B$^1$ and B$^2$ each represents —CR$^1$= and —CR$^2$=, or one of them represents a nitrogen atom and the other of them represents —CR$^1$= or —CR$^2$=. R$^5$ and R$^6$ represents each independently a hydrogen atom, aliphatic group, aromatic group, heterocyclic group, acyl group, alkoxycarbonyl group, aryloxycarbonyl group, carbamoyl group, alkyl or arylsulfonyl group, or sulfamoyl group in which each group may further have a substituent.

G, R¹, and R² each represents independently, a hydrogen atom, halogen atom, aliphatic group, aromatic group, heterocyclic group, cyano group, carboxyl group, carbamoyl group, alkoxycarbonyl group, aryloxycarbonyl group, heterocyclicoxycarbonyl group, acyl group, hydroxy group, alkoxy group, aryloxy group, heterocyclicoxy group, silyloxy group, acyloxy group, carbamoyloxy group, alkoxycarbonyloxy group, aryloxycarbonyloxy group, amino group (including heterocyclicamino group and anilino group), acylamino group, ureido group, sulfamoylamino group, alkoxycarbonylamino group, aryloxyarbonylamiono group, alkyl or arylsulfonylamino group, heterocyclic sulfonylamino group, nitro group, alkyl or arylthio group, alkyl or arylsulfonyl group, heterocyclic sulfonyl group, alkyl or arylsulfinyl group, heterocyclic sulfinyl group, sulfamoyl group, sulfo group, or heterocyclicthio group, in which each group may be further substituted. R¹ and R⁵ or R⁵ and R⁶ may join to each other to form a 5- or 6-membered ring.

In the general formula (M-I), A represents the residue of 5-membered heterocyclic diazo ingredient A-NH₂. Examples of the hetero atoms for the heterocyclic ring include N, O and S. A nitrogen-containing 5-membered heterocyclic ring is preferred and the heterocyclic ring may be condensed with an aliphatic ring, aromatic ring or other heterocyclic ring. Preferred examples of heterocyclic ring of A includes, pyrazole ring, imidazole ring, thiazole ring, isothiazole ring, thiadiazole ring, benzothiazole ring, benzooxazole ring, and benzoisothiazole ring. Each of the heterocyclic ring group may further have a substituent. Among them, pyrazole ring, imidazole ring, isothiazole ring, thiadiazole ring, and benzothiazole ring are particularly preferred.

Formula

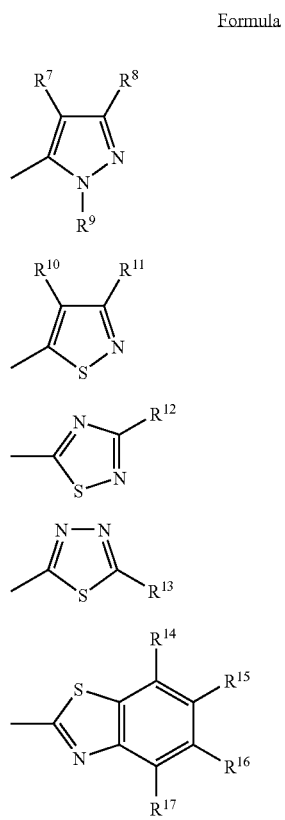

(a)

(b)

(c)

(d)

(e)

-continued

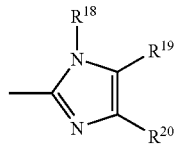

(f)

In the general formulae (a) to (f), $R^7$ to $R^{20}$ represent identical substituents as those substituents described for G, $R^1$, and $R^2$. Among those represented by the general formulae (a) to (f), preferred are pyrazole ring and isothiazole ring represented by the general formula (a) and (b) and, more preferred are the pyrazole ring represented by the general formula (a).

In the general formula (M-I), $B^1$ and $B^2$ each represents —CR¹= and —CR²= or one of them represents a nitrogen atom and the other of them represents —CR¹= or —CR²=, and those each representing —CR¹= or —CR²= are more preferred.

$R^5$ and $R^6$ each represents independently a hydrogen atom, aliphatic group, aromatic group, heterocyclic group, acyl group, alkoxycarbonyl group, aryloxycarbonyl group, carbamoyl group, alkyl or arylsulfonyl group, and sulfamoyl group, and each group may have a further substituent. Further, preferred represented by $R^5$ and $R^6$ include a hydrogen atom, aliphatic group, aromatic group, heterocyclic group, acyl group, and alkyl or arylsulfonyl group. More preferred are a hydrogen atom, aromatic group, heterocyclic group, acyl group, and alkyl or arylsulfonyl group. Most preferred are a hydrogen atom, aryl group and heterocyclic group. Each of the groups may further have a substituent providing that $R^5$ and $R^6$ are not simultaneously hydrogen atoms.

G, R¹, and R¹ each represents, independently, a hydrogen atom, halogen atom, aliphatic group, aromatic group, heterocyclic group, cyano group, carboxyl group, carbamoyl group, alkoxycarbonyl group, aryloxycarbonyl group, heterocyclicoxy carbonyl group, acyl group, hydroxy group, alkoxy group, aryloxy group, heterocyclicoxy group, silyloxy group, acyloxy group, carbamoyloxy group, alkoxycarbonyloxy group, aryloxycarbonyloxy group, amino group (including anilino group and heterocyclicamino group), acylamino group, ureido group, sulfamoylamino group, alkoxycarbonylamino group, aryloxyarbonylamiono group, alkyl or arylsulfonylamino group, heterocyclic sulfonylamino group, nitro group, alkyl or arylthio group, heterocyclic thio group, alkyl or arylsulfonyl group, heterocyclic sulfonyl group, alkyl or arylsulfinyl group, heterocyclic sulfinyl group, sulfamoyl group, or sulfo group. In which each group may be further substituted.

The substituents represented by G preferably includes a hydrogen atom, halogen atom, aliphatic group, aromatic group, hydroxyl group, alkoxy group, aryloxy group, acyloxy group, heterocyclicoxy group, amino group (including anilino group and heterocyclicamino group), acylamino group, ureido group, sulfamoylamino group, alkoxycarbonylamino group, aryloxycarbonylamino group, alkyl and arylthio group and heterocyclicthio group and, more preferably, a hydrogen atom, halogen atom, alkyl group, hydroxy group, alkoxy group, aryloxy group, acyloxy group, amino group (including anilino group and heterocyclicamino group), or acylamino group and, most preferably, a hydrogen atom, anilino group, and acylamino group. Each of the group may further have a substituent.

Preferred substituents represented by $R^1$ and $R^2$ are a hydrogen atom, alkyl group, halogen atom, alkoxycarbonyl group, carboxyl group, carbamoyl group, hydroxy group, alkoxy group, and cyano group. Each groups may further have a substituent. $R^1$ and $R^5$ or $R^5$ and $R^6$ may join to each other to form a 5- or 6-membered ring.

The substituent in a case where each of the substituents represented by A, $R^1$, $R^2$, $R^5$, $R^6$, and G further has a substituent includes those substituents described for G, $R^1$, $R^2$.

In a case where the dye of the invention is a water soluble dye, it is preferred that an ionic hydrophilic group is further present as a substituent at the position on any of A, $R^1$, $R^2$, $R^5$, $R^6$, and G. The ionic hydrophilic group as a substituent includes, for example, a sulfo group, carboxyl group, phosphono group, and quaternary ammonium group. As the ionic hydrophilic group, a carboxyl group, phosphono group, and sulfo group are preferred and the carboxyl group and the sulfo group are particularly preferred. The carboxyl group, the phosphono group and the sulfo group may be in the form of salt, and examples of pair ion forming the salt include ammonium ion, alkali metal ion (for example, lithium ion, sodium ion, and potassium ion) and organic cation (for example, tetramethyl ammonium ion, tetramethyl guanidium ion, and tetramethyl phosphonium).

In the specification of the present application, the alkyl group is a conceptional expression that means a saturated monovalent hydrocarbon group in the form of chain, branch or ring (which may be a mono-nuclear or poly-nuclear ring, and may also be a bridged or a spiro ring in the case of poly-nuclear ring) or a combination obtained therefrom and including a cycloalkyl group and a cycloalkyl alkyl group. In a case where it may be substituted with a further substituent, it includes a substituted alkyl group.

Further, in the specification of the present application, the alkenyl group in a concept that means a saturated monovalent hydrocarbon group containing one or more carbon-carbon double bond excluding a aromatic group in the form of chain, branch or ring (which may be a mono-nuclear or poly-nuclear ring and may also be a bridged or spiro ring in the case of poly-nuclear ring), or a combination obtained therefrom, which is a concept including the cycloalkyl group and the cycloalkyl alkyl group. In a case where it may be substituted with a further substituent, it includes a substituted alkenyl group.

In the specification of the present application, the substituent alkyl group means an alkyl group where hydrogen atom of the alkyl group is substituted with other substituent and one or more substituents can be substituted each by the number of one or more. Other substituted alkyl groups, etc. are identical with those described above.

In the specification, the aliphatic group means an alkyl group, a substituted alkyl group, alkenyl group, substituted alkenyl group, alkynyl group, substituted alkynyl group, aralkyl group, and substituted aralkyl group. The aliphatic group may have a branch or may form a ring. The number of carbon atoms of the aliphatic group, is preferably, from 1 to 20, more preferably, from 1 to 16. The aryl moiety in the aralkyl group and the substituted aralkyl group is preferably phenyl or naphthyl and particularly preferably phenyl. Examples of the aliphatic group includes, methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

In this specification, the aromatic group means an aryl group or substituted aryl group. The aryl group is preferably phenyl or naphthyl, and particular preferably, phenyl. The aromatic group has, preferably, from 6 to 20 and, further preferably, from 6 to 16 carbon atoms. Examples of the aromatic group include phenyl, p-tolyl, p-methoxyphenyl, o-chlorophenyl, and m-(3-sulfopropylamino) phenyl.

The heterocyclic group includes a heterocyclic group having a substituent and a heterocyclic group not having a substituent. An aliphatic ring, an aromatic ring or other heterocyclic rings may be condensed to the heterocyclic group. The heterocyclic group is preferably a five- or six-membered heterocyclic ring. Examples of the substituent include an aliphatic group, halogen atom, alkyl and arylsulfonyl group, acyl group, acylamino group, sulfamoyl group, carbamoyl group, and ionic hydrophilic group. Examples of the heterocyclic group include 2-pyridyl group, 2-thienyl group, 2-thiazolyl group, 2-benzothiazolyl group, 2-benzooxazolyl group, and 2-furyl group.

The alkyl and arylsulfonyl group include alkyl and aryl sulfonyl groups having a substituent, alkyl and arylsulfonyl groups not having a substituent. Examples of the alkyl and arylsulfonyl groups include a methylsulfonyl group and a phenyl sulfonyl group respectively.

The alkyl and arylsulfinyl groups include alkyl and aryl sulfinyl groups having a substituent and alkyl and aryl sulfinyl groups not having a substituent. Examples of the alkyl and arylsulfinyl groups include a methylsulfinyl group and a phenylsulfinyl group respectively.

The acyl group includes an acyl group having a substituent and an acyl group not having a substituent. As the acyl group, an acyl group of 1 to 20 carbon atoms is preferred. Examples of the substituent include an ionic hydrophilic group, and examples of the acyl group include an acetyl group and a benzoyl group.

The halogen atom includes fluorine atom, chlorine atom, and bromine atom.

The amino group includes an amino group substituted with an alkyl group, aryl group, or heterocyclic group, and the alkyl group, aryl group and heterocyclic group may further have a substituent. Examples of the substituent include an ionic hydrophilic group. Examples of the alkylamino group include a methylamino group and a diethylamino group.

The arylamino group includes an arylamino group having a substituent and an arylamino group not having a substituent. As the arylamino group, an arylamino group of 6 to 20 carbon atoms is preferred. Examples of the substituent include a halogen atom and ionic hydrophilic group. Examples of the arylamino group include a phenylamino group and 2-chlorophenylamino group.

The heterocyclic amino group includes a heterocyclic amino group having a substituent and a heterocyclic amino group not having a substituent. As the heterocyclic amino group, a heterocyclic amino group of 2 to 20 carbon atoms is preferred. Examples of the substituent include an alkyl group, halogen atom, and ionic hydrophilic group.

The alkoxy group includes an alkoxy group having a substituent and an alkoxy group not having a substituent. As the alkoxy group, an alkoxy group of 1 to 20 carbon atoms is preferred. Examples of the substituent include an alkoxy group, hydroxyl group, and ionic hydrophilic group. Examples of the alkoxy group include a methoxy group, ethoxy group, isopropoxy group, methoxyethoxy group, hydroxyethoxy group, and 3-carboxypropoxy group.

The aryloxy group includes an aryloxy group having a substituent and an aryloxy group not having a substituent. As the aryloxy group, an aryloxy group of 6 to 20 carbon atoms is preferred. Examples of the substituent include an alkoxy group and ionic hydrophilic group. Examples of the aryloxy group include a phenoxy group, p-methoxyphenoxy group, and o-methoxyphenoxyl group.

As the silyloxy group, a silyloxy group of 1 to 20 carbon atoms, substituted with an aliphatic group or aromatic group is preferred. Examples of the silyoxy group include trimethylsilyloxy and diphenylmethylsilyloxy.

The heterocyclic oxy group includes a heterocyclic oxy group having a substituent and a heterocyclic oxy group not having a substituent. As the heterocyclic oxy group, a heterocyclic oxy group of 2 to 20 carbon atoms is preferred. Examples of the substituent include an alkyl group, alkoxy group, and ionic hydroxyl group. Examples of the substituent include an alkyl group, alkoxy group, and ionic hydrophilic group. Examples of the heterocyclic oxy group include 3-pyridyl group and 3-thienyloxy group.

The alkoxycarbonyloxy group includes an alkoxycarbonyloxy group having a substituent and an alkoxycarbonyloxy group not having a substituent. As the alkoxycarbonyloxy group, an alkoxycarbonyloxy group of 2 to 20 carbon atoms is preferred. Examples of the alkoxycarbonyloxy group include a methoxycarbonyloxy group, and isopropoxycarbonyl oxy group.

The aryloxycarbonyloxy group includes an aryloxy carbonyloxy group having a substituent and an aryloxycarbonyloxy group not having a substituent. As the aryloxy carbonyloxy group, an aryloxycarbonyloxy group of 7 to 20 carbon atoms is preferred. Examples of the aryloxycarbonyloxy group include a phenoxycarbonyloxy group.

The acylamino group includes an acylamino group having a substituent and an acylamino group not having a substituent. As the acylamino group, an acylamino group of 2 to 20 carbon atoms is preferred. Examples of the substituent include an ionic hydrophilic group. Examples of the acylamino group include an acetyl amino group, propyonylamino group, benzoylamino group, N-phenylacetyl amino group and 3,5-disulfobenzoyl amino group.

The ureido group includes an ureido group having a substituent and an ureido group not having a substituent. As the ureido group, an ureido group of 1 to 20 carbon atoms is preferred.

Examples of the substituent include an alkyl group and aryl group. Examples of the ureido group include 3-methylureido group, 3,3-dimethylureido group, and 3-phenylureido group.

The sulfamoyl amino group includes a sulfamoyl amino group having a substituent and a sulfamoyl amino group not having a substituent. Examples of the substituent include an alkyl group. Examples of the sulfamoyl group include an N,N-dipropylsulfamoyl amino group.

The alkoxycarbonylamino group includes an alkoxycarbonyl amino group having a substituent and an alkoxycarbonylamino group not having a substituent. As the alkoxycarbonylamino group, an alkoxycarbonylamino group of 2 to 20 carbon atoms is preferred. Examples of the substituent include an ionic hydrophilic group. Examples of the alkoxycarbonylamino group include an ethoxycarbonylamino group.

The alkyl and arylsulfonylamino groups include alkyl and aryl sulfonyl amino groups having a substituent and alkyl and arylsulfonylamino groups not having a substituent. As the sulfonylamino group, a sulfonylamino group of 1 to 20 carbon atoms is preferred. Examples of the substituent include an ionic hydrophilic group. Examples of the sulfonylamino group include a methylsulfonylamino group, N-phenylmethyl sulfonyl amino group, phenylsulfonyl amino group, and 3-carboxyphenylsulfonyl amino group.

The carbamoyl group includes a carbamoyl group having a substituent and a carbamoyl group not having a substituent. Examples of the substituent include an alkyl group. Examples of the carbamoyl group include a methylcarbamoyl group and dimethylcarbamoyl group.

The sulfamoyl group includes a sulfamoyl group having a substituent and a sulfamoyl group not having a substituent. Examples of the substituent includes an alkyl group. Examples of the sulfamoyl group include a dimethylsulfamoyl group and di-(2-hydroxyethyl)sulfamoyl group.

The alkoxycarbonyl group includes an alkoxycarbonyl group having a substituent and an alkoxycarbonyl group not having a substituent. As the alkoxycarbonyl group, an alkoxycarbonyl group of 2 to 20 carbon atoms is preferred. Examples of the substituent include an ionic hydrophilic group. Examples of the alkoxycarbonyl group include a methoxycarbonyl group and ethoxycarbonyl group.

The acyloxy group includes an acyloxy group having a substituent and an acyloxy group not having a substituent. As the acyloxy group, an acyloxy group of 1 to 20 carbon atoms is preferred. Examples of the substituent include an ionic hydrophilic group. Examples of the acyloxy group include an acetoxy group and a benzoyloxy group.

The carbamoyloxy group include a carbamoyloxy group having a substituent and a carbamoyloxy group not having a substituent. Examples of the substituent includes an alkyl group. Examples of the carbamoyloxy group include an N-methylcarbamoyloxy group.

The aryloxy carbonyl group includes an aryloxycarbonyl group having a substituent and an aryloxycarbonyl group not having a substituent. As the aryloxycarbonyl group, an aryloxycarbonyl group of 7 to 20 carbon atoms is preferred. Examples of the subsistent include an ionic hydrophilic group. Examples of the aryloxycarbonyl group include a phenoxycarbonyl group.

The aryloxy carbonylamino group includes an aryloxycarbonyl amino group having a substituent and an aryloxycarbonylamino group not having a substituent. As the aryloxycarbonylamino group, an aryloxycarbonylamino group of 7 to 20 carbon atoms is preferred. Examples of the substituent include an ionic hydrophilic group. Examples of the aryloxycarbonylamino group include a phenoxycarbonyl amino group.

The alkyl, aryl and heterocyclicthio groups include alkyl, aryl and heterocyclicthio groups having a substituent, and alkyl, aryl and heterocyclicthio group not having a substituent. As the alkyl, aryl and heterocyclicthio groups, those of 1 to 20 carbon atoms are preferred. Examples of the substituent include an ionic hydrophilic group. Examples of the alkyl, aryl and heterocyclicthio groups include a methyl thio group, phenyl thio group and 2-pyridyl thio group.

The heterocyclic oxycarbonyl group includes a heterocyclicoxy carbonyl group having a substituent and a heterocyclicoxy carbonyl group not having a substituent. As the heterocyclicoxy carbonyl group, a heterocyclic oxycarbonyl group of 2 to 20 carbon atoms is preferred. Examples of the substituent include an ionic hydrophilic group. Examples of the heterocyclicoxy carbonyl group include a 2-pyridyloxycarbonyl group.

The heterocyclic sulfonylamino group includes a heterocyclic sulfonylamino group having a substituent and a sulfonylamino group not having a substituent. As the heterocyclic sulfonylamino group, a heterocyclic sulfonylamino group of 1 to 12 carbon atoms is preferred. Examples of the substituent include an ionic hydrophilic group. Examples of the heterocyclic sulfonyl amino group include a 2-thiophene sulfonylamino group and 3-pyridine sulfonylamino group.

The heterocyclic sulfonyl group includes a heterocyclic sulfonyl group having a substituent and a heterocyclic sulfonyl group not having a substituent. As the heterocyclic sulfonyl group, a heterocyclic sulfonyl group of 1 to 20 carbon atoms is preferred. Examples of the substituent include an ionic hydrophilic group. Examples of the heterocyclic sulfonyl group include a 2-thiophenesulfonyl group and 3-pyridine sulfonyl group.

The heterocyclic sulfinyl group includes a heterocyclic sulfinyl group having a substituent and a heterocyclic sulfinyl group not having a substituent. As the heterocyclic sulfinyl group, a heterocyclic sulfinyl group of 1 to 20 carbon atoms is preferred. Examples of the substituent include an ionic hydrophilic group. Examples of the heterocyclic sulfinyl group include 4-pyridine sulfinyl group.

In the invention, the dye represented by the general formula (M-1) is preferably a dye represented by the following general formula (M-II).

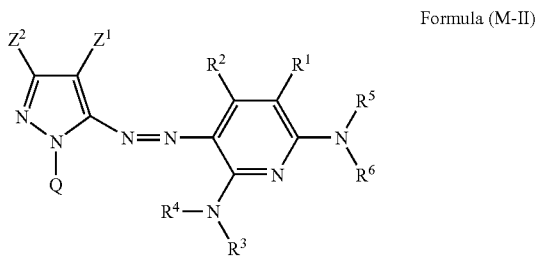

Formula (M-II)

In the general formula (M-II), $Z_1$ preferably represents an electron attracting group having a Hammett's substituent constant σp value of 0.20 or more. Preferably, $Z_1$ represents an electron attracting group having the σp value of 0.30 or more, further preferably, represents an electron attracting group having the value of 0.45 or more and particularly preferably an electron attracting group having the value of 0.60 or more, preferably the value not exceeding 1.0. Specific preferred examples of the substituent include electron attracting groups to be described later. Among them, preferred are an acyl group of 2 to 20 carbon atoms, an alkyloxy carbonyl group of 2 to 20 carbon atoms, nitro group, cyano group, alkylsulfonyl group of 1 to 20 carbon atoms, arylsulfonyl group of 6 to 20 carbon atoms, carbamoyl group of 1 to 20 carbon atoms, and halogenated alkyl group of 1 to 20 carbon atoms. Particularly preferred are a cyano group, alkylsulfonyl group of 1 to 20 carbon atoms, arylsulfonyl group of 6 to 20 carbon atoms, and a cyano group is most preferred.

$R^1$, $R^2$, $R^5$ and $R^6$ have the same meaning as those for the general formula (M-1). $R^3$ and $R^4$ each independently represents a hydrogen atom, aliphatic group, aromatic group, heterocyclic group, acyl group, alkoxy carbonyl group, aryloxy carbonyl group, carbamoyl group, alkyl and aryl sulfonyl groups or sulfamoyl group. Among them, preferred are a hydrogen atom, aromatic group, heterocyclic group, acyl group, alkyl or aryl sulfonyl group, and particularly preferred are a hydrogen atom, aromatic group, and heterocyclic group. $Z_2$ represents a hydrogen atom, aliphatic group, aromatic group or heterocyclic group. Q represents a hydrogen atom, aliphatic group, aromatic group, or heterocyclic group. Among them, Q is preferably a group consisting of non-metal atom group required for forming a 5- to 8-membered ring. The 5- to 8-membered ring may be substituted, may be a saturated ring or may have an unsaturation bond. Among them, an aromatic group and heterocyclic group are particularly preferred. Preferred non-metal atom includes a nitrogen atom, oxygen atom, sulfur atom and carbon atom. Specific examples of the ring structure include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzooxazole ring, thiazole ring, benzothiazole ring, oxane ring, sulfolane ring and thiane ring.

Each group described in the general formula (M-II) may further have a substituent. In a case where each group of them further has a substituent, the substituent includes a substituent described in the general formula (M-I), a group exemplified in G, $R^1$ and $R^2$, and an ionic hydrophilic group.

Examples of the electron attracting group having a Hammett's σp value of 0.60 or more include a cyano group, nitro group, alkylsulfonyl group (for example, a methane sulfonyl group, and arylsulfonyl group (for example, a benzene sulfonyl group)).

The electron attracting group having a Hammett's σp value of 0.45 or more includes, in addition to the groups described above, an acyl group (for example, acetyl), alkoxycarbonyl group (for example, dodecyloxy carbonyl), aryloxycarbonyl group (for example, an m-chlorophenoxy carbonyl), alkylsulfinyl group (for example, n-propyl sulfinyl), arylsulfinyl group (for example, a phenylsulfinyl), sulfamoyl group (for example, N-ethylsulfamoyl, N,N-dimethyl sulfamoyl, and halogenated alkyl group (for example, trifluoromethyl).

The electron attracting group having a Hammett's σp value of 0.30 or more includes, in addition to the groups described above, an acyloxy group (for example, acetoxy), carbamoyl group (for example, N-ethylcarbamoyl, N,N-dibutyl carbamoyl), halogenated alkoxy group (for example, trifluoromethyloxy), halogenated aryloxy group (for example, pentafluorophenyloxy), sulfonyloxy group (for example, methylsulfonyloxy), halogenated alkylthio group (for example, difluoromethylthio), aryl group substituted with two or more electron attracting groups having a σp value of 0.15 or more (for example, 2,4-dinitrophenyl and pentachlorophenyl), and heterocyclic ring (for example, 2-benzooxazolyl, 2-benzothiazolyl, 1-phenyl-2-benzimidazolyl). Specific examples of the electron attracting group having a σp value of 0.20 or more include a halogen atom in addition to those described above.

A particularly preferred combination of substituents as an azo dye represented by the general formula (M-I) includes, as $R^5$ and $R^6$, are a hydrogen atom, alkyl group, aryl group, heterocyclic group, sulfonyl group, and acyl group. More preferred are a hydrogen atom, aryl group, heterocyclic group, and sulfonyl group, and most preferred are a hydrogen atom, aryl group, and heterocyclic group. However, $R^5$ and $R^6$ are not simultaneously hydrogen atoms.

G preferably includes a hydrogen atom, halogen atom, alkyl group, hydroxyl group, amino group, and acylamino group, further preferably, a hydrogen atom, halogen atom, amino group, acylamino group and, preferably, a hydrogen atom, amino group, and acylamino group.

Among A, preferred are a pyrazole ring, imidazole ring, isothiazole ring, thiadiazole ring, and benzothiazole ring, further preferred are a pyrazole ring and isothiazole ring, and most preferred are pyrazole ring.

$B^1$ and $B^2$ each represents —$CR^1$=, —$CR^2$=, and $R^1$ and $R^2$ each represents preferably a hydrogen atom, alkyl group, halogen atom, cyano group, carbamoyl group, carboxyl group, hydroxyl group, alkoxy group, or alkoxycarbonyl group, and further preferably, a hydrogen atom, alkyl group, carboxyl group, cyano group, or carbamoyl group.

Preferred cyan dye includes a dye represented by the following general formula (C-1).

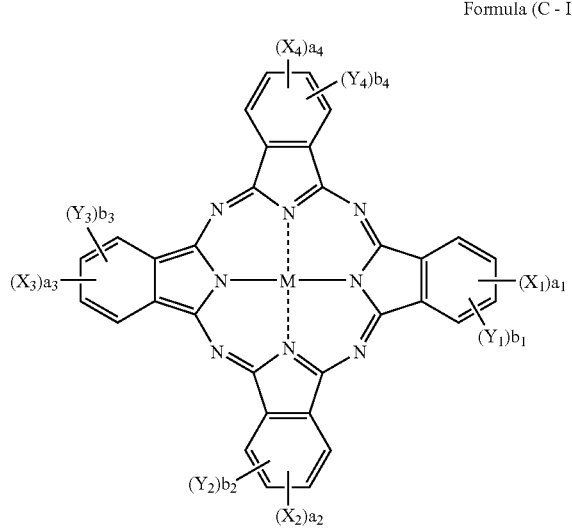

Formula (C-I)

In the general formula (C-I), $X_1$, $X_2$, $X_3$ and $X_4$ each independently represents an electron attracting group having a cup value of 0.40 or more. $Y_1$, $Y_2$, $Y_3$ and $Y_4$ each independently represents a monovalent substituent. M represents a hydrogen atom, metal element or oxide, hydroxide or halide thereof. $a_1$ to $a_4$, and $b_1$ to $b_4$ each represents a number of substituents in $X_1$ to $X_4$ and $Y_1$ to $Y_4$, respectively. $a_1$ to $a_4$ each independently represents an integer of 0 to 4, and $b_1$ to $b_4$ each independently represents an integer of from 0 to 4, providing that the total for $a_1$ to $a_4$ is 2 or more, preferably, 3 or more and, particularly, a case where $a_1=a_2=a_3=a_4=1$ is most preferred. In a case where the dye is a water soluble dye, it is preferred that an ionic hydrophilic group is present as a substituent, is present at any position of $X_1$, $X_2$, $X_3$, $X_4$, $Y_1$, $Y_2$, $Y_3$ and $Y_4$. The ionic hydrophilic group as a substituent includes a sulfo group, carboxyl group, phosphono group, quaternary ammonium group, etc.

Among the phthalocyanine dye represented by the general formula (C-I). A phthalocyanine dye having a structure represented by the general formula (C-II) is further preferred. A phthalocyanine dye represented by the general formula (C-II) is to be explained in details below.

In the general formula (C-II), $X_{11}$ to $X_{14}$ each independently represents —SO-Z, —SO$_2$-Z, —SO$_2$NR$_1$R$_2$, sulfo group, —CONR$_1$R$_2$, or —CO$_2$R$_1$. $Y_{11}$ to $Y_{15}$ each independently represents a monovalent substituent. M represents a hydrogen atom, metal atom or oxide, hydroxide or halide thereof. $a_{11}$ to $a_{14}$ each represents a number of substituents in $X_{11}$ to $X_{14}$, and each represents an integer of 1 or 2.

Z each independently represents a substituted or unsubstituted alkyl group, a substituted or unsubstituted cycloalkyl group, substituted or unsubstituted alkenyl group, substituted or unsubstituted aralkyl group, substituted or unsubstituted aryl group, or substituted or unsubstituted heterocyclic group. $R_1$ and $R_2$ each independently represents a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group, or substituted or unsubstituted heterocyclic group.

In the general formula (C-II), $a_{11}$ to $a_{14}$ each independently represents an integer of 1 or 2, particularly preferably, $4 \leq a_{11}+a_{12}+a_{13}+a_{14} \leq 6$, and among them, $a_{11}=a_{12}=a_{13}=a_{14}=1$ is particularly preferred.

$X_{11}$, $X_{12}$, $X_{13}$ and $X_{14}$ each may be the same substituent, or, for example, the substituents may be of the same type but partially different from each other as in a case where all $X_{11}$, $X_{12}$, $X_{13}$ and $X_{14}$ represent —SO$_2$-Z, but Z are different from each other. Alternatively, they may also contain substituents which are different from each other as in a case where —SO$_2$-Z and —SO$_2$NR$_1$R$_2$ are simultaneously substituted.

Among the phthalocyanine dyes represented by the general formula (C-II), a particularly preferred combination of substituents is as follows.

Preferably, $X_{11}$ to $X_{14}$ each independently represents —SO-Z, —SO$_2$-Z, —SO$_2$NR$_1$R$_2$ or —CONR$_1$R$_2$, more preferably —SO$_2$-Z or —SO$_2$NR$_1$R$_2$, most preferably —SO$_2$-Z.

Preferably, Z each independently represents a substituted or unsubstituted alkyl group, substituted or unsubstituted aryl group, substituted or unsubstituted heterocyclic group. Among them, the substituted alkyl group, substituted aryl group, and substituted heterocyclic group are most preferred. In view of the reason for improving the solubility of the dye or the stability of the ink, a case of containing asymmetric carbon in the substituent (use in the racemi-form) is preferred. Further, in view of the reason for enhancing the associative property and improving the fastness, it is preferred that a hydroxide, ether group, ester group, cyano group, amido group or sulfoneamide group is contained in the substituent.

Preferably, $R_1$ and $R_2$ each independently represents a hydrogen atom, substituted or unsubstituted alkyl group, substituted or unsubstituted aryl group, or substituted or unsubstituted heterocyclic group. Among them, most preferred are a hydrogen atom, substituted alkyl group, substituted aryl group or substituted heterocyclic group, but it is not preferred that both of $R_1$ and $R_2$ represent hydrogen atoms simultaneously. In particular, in view of the reason for improving the solubility of the dye or the stability of the ink, it is preferred that asymmetric carbon is present in the substituent (use in the racemi-form). Further, in view of the reason for enhancing the associative property and improving the fastness, a it is preferred that a hydroxide, ether group, ester group, cyano group, amido group, or sulfoneamide group is contained in the substituent.

Preferably, $Y_{11}$ to $Y_{18}$ each represents a hydrogen atom, halogen atom, alkyl group, aryl group, cyano group, alkoxy group, amido group, ureido group, sulfonamide group, carbamoyl group, sulfamoyl group, alkoxycarbonyl group, carboxyl group and sulfo group, and particularly preferred are a hydrogen atom, halogen atom, cyano group, carboxyl group and sulfo group, with the hydrogen atom being most preferred. Preferably, $a_{11}$ to $a_{14}$ each independently represents 1 or 2, particularly, it is preferred that all of them represent 1. M represents a hydrogen atom, metal element or an oxide, hydroxide or halide thereof, particularly, Cu, Ni, Zn and Al are preferred. Among them Cu is most preferred particularly.

In a case where the phthalocyanine dye represented by (C-I) or (C-II) is water soluble, it is preferred that an ionic hydrophilic group is contained. The ionic hydrophilic group includes a sulfo group, carboxyl group, phosphono group, quaternary ammonium group, etc. As the ionic hydrophilic group, a carboxyl group, phosphono group and sulfo group are preferred, and particularly, a carboxyl group and sulfo group are preferred. The carboxyl group, phosphor group, and sulfo group may be in the form of a salt, and examples of the counter ion which forms a salt include an ammonium ion, alkali metal ion (for example, lithium ion, sodium ion, and potassium ion) and an organic cation (for example, tetramethylammonium ion, tetramethyl guanidium ion, and tetramethyl phosphonium). Among the counter ions, an alkali metal salt is preferred, and particularly, a lithium salt is preferred since it enhances the solubility of a dye and improve the stability of an ink.

As the number of the ionic hydrophilic group, it is proffered that two or more of them are present in one molecule of the phthalocyanine dye, and it is particularly, preferred that two or more of sulfo groups and/or carboxyl groups are contained.

As a preferred combination of the substituents for the compound represented by the general formula (C-II), a compound having the preferred group described above for at least one of various substituents is preferred, a compound having the preferred group described above for more various substituents is more preferred, and a compound having the preferred group described above for all of the substituents is most preferred.

As the chemical structure of the phthalocyanine dye used preferably in the invention, it is preferred that electron attracting groups such as sulfinyl group, sulfonyl group, and sulfamoyl group are introduced by at least one for each of four benzene rings of the phthalocyanine such that the σp value of the substituents for the entire phthalocyanine skeleton is 1.6 or more in total.

Phthalocyanine derivative represented by the general formula (C-I) is, generally, a mixture of analogous compounds which are inevitably different in view of the position and the number of the substituents Xn (n=1 to 4) and Ym (m=1 to 4) to be introduced depending on the synthesis method. Accordingly, the general formula often expresses analogous mixture in a statically averaged state. In the invention, it has been found that when the mixture of analogous compounds are classified into three types described below, a specific mixture is particularly preferred. Namely, the mixture of the analogous compounds of the phthalocyanine dyes represented by the general formula (C-I) and (C-II) is classified into three types to be described below and defined based on the position of the substitution.

(1) β-position substitution type: a phthalocyanine dye having specific substituents on 2 and/or 3 position, 6 and/or 7 position, 10 and/or 11 position, 14 and/or 15 position
(2) α-position substitution type: a phthalocyanine dye having specific substituents on 1 and/or 4 position, 5 and/or 8 position, 9 and/or 12 position, 13 and/or 16 position
(3) α, β-position-mixed substitution type: a phthalocyanine dye having specific substituents on 1 to 16 positions with no regularity.

In the specification of the invention, when explaining derivatives of the phthalocyanine dye having different structures (particularly, different in the substitution position), the β-position substitution type, the α-position substitution type, and the α, β-position-mixed substitution type are used.

The phthalocyanine derivative to be used in the invention can be synthesized by the processes described or cited in, for example, "Phthalocyanine—Chemistry and Function-" (P. 1 to 62) collaborated by Shirai and Kobayashi, published from I.P.C. Co. Ltd., and "Phthalocyanines—Properties and Applications" (P. 1 to 54) collaborated by C. C. Leznoff and A. B. P. Lever, published from VCH, or by a method similar therewith.

As described in, for example, WO Nos. 00/17275, 00/08103, 00/08101, and 98/41853, and JP-A No. 10/36471, the phthalocyanine compound represented by the general formula (C-I) of the invention can be synthesized, for example, by way of sulfonation, sulfonyl chloridation or amidation reaction of an unsubstituted phthalocyanine compound. In this case, the sulfonation may occur at any position on the phthalocyanine nuclear, and it is also difficult to control the number of cites to be sulfonated. Accordingly, in a case where sulfo groups are introduced under such a reaction condition, the position and the number of sulfo groups introduced into the product can not be determined, to inevitably give a mixture different in the number of the substituents and the positions for the substitution. Accordingly, when synthesizing the compound of the invention using the product as a starting material, since the number of sulfamoyl groups for substitution of heterocyclic ring and the position for the substitution can not be determined, the compound of the invention is obtained as an α, β-position mixed substitution type mixture containing several kinds of compounds different in the number of substitutions and the positions for the substitution.

As described above, in a case where a large number of the electron attracting groups such as sulfamoyl groups are introduced to the phthalocyanine nuclear, the oxidation potential become more electropositive, to enhance the ozone resistance. According to the synthesis method described above, a phthalocyanine dye having small number of electron attracting groups introduced, that is, a phthalocyanine dye of less electronegative oxidation potential is inevitably mixed. Accordingly, in order to improve the ozone resistance, it is more preferred to adopt a synthesis method capable suppressing the formation of a compound having a more electronegative oxidation potential.

On the contrary, the phthalocyanine compound represented by the general formula (C-II) is obtained by reacting, for example, a phthalonitrile compound (compound P) represented by the following formula and/or a diiminoisoindoline derivative (compound Q) with a metal derivative represented by the general formula (C-III). Alternatively, the aimed phthalocyanine compound can be derived from a tetrasulfophthalocyanine compound obtained by reacting a 4-sulfophthalic acid derivative (compound R) represented by the following formula with a metal derivative represented by the general formula (C-III).

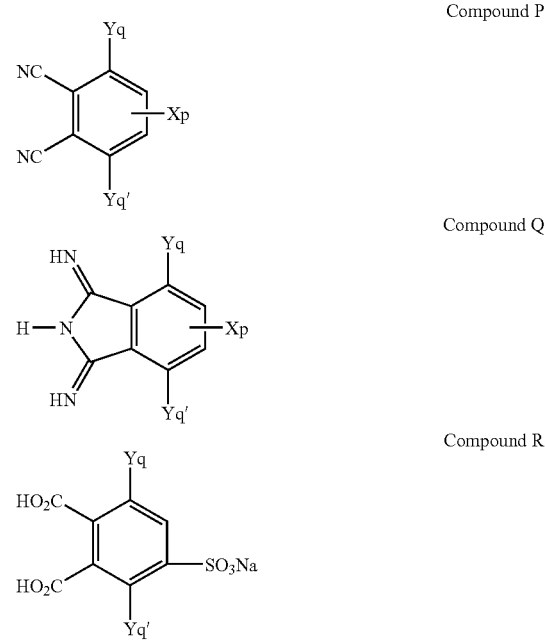

In each of the formulae, Xp corresponds to $X_1, X_2, X_3$ or $X_4$ in the general formula (C-II) described above. Yq, and Yq' each corresponds to $Y_{11}, Y_{12}, Y_{13}, Y_{14}, Y_{15}, Y_{16}, Y_{17}$ or $Y_{18}$ in the general formula (C-II) described above. In the compound R, M' represents a cation.

M-(Y)d      Formula (C-III):

In the general formula (C-III), M is identical with M in the general formula (C-II), Y represents a monovalent or divalent ligand such as a halogen atom, an acetate anion, acetyl acetonate, and oxygen, and d represents an integer of from 1 to 4.

That is, according to the synthesis method described above, desired substituents can be introduced just by the specified number. In particular, in a case where large number of electron attracting groups are intended to be introduced in order to make the oxidation potential more electropositive, the synthesis method described above is extremely excellent compared with the synthesis method of the phthalocyanine compound of the general formula (C-I).

The phthalocyanine compound represented by the general formula (C-II) thus obtained is a mixture of compounds represented by the general formulae (a)-1 to (a)-4 described below which are isomers with Xp at each of substitution positions, that is, β-position substitution type.

Formula (a)-1

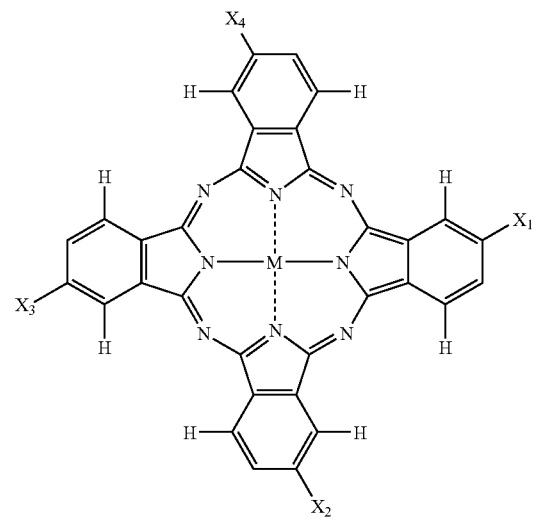

Formula (a)-2

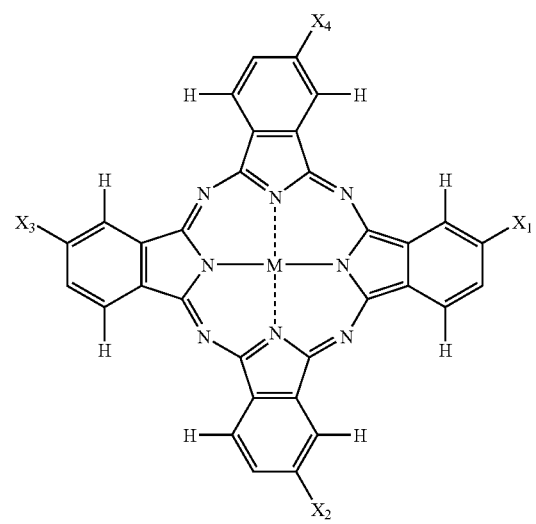

Formula (a)-3

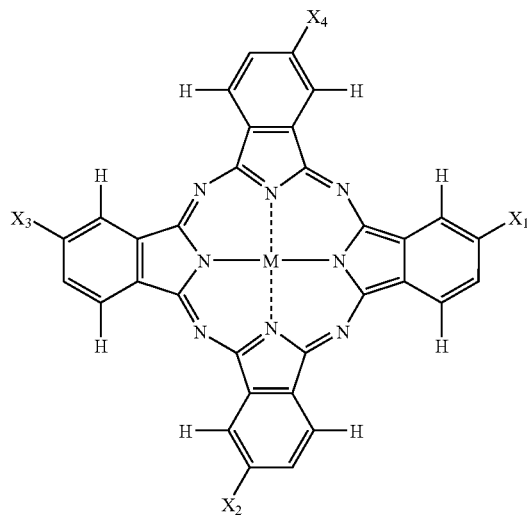

Formula (a)-4

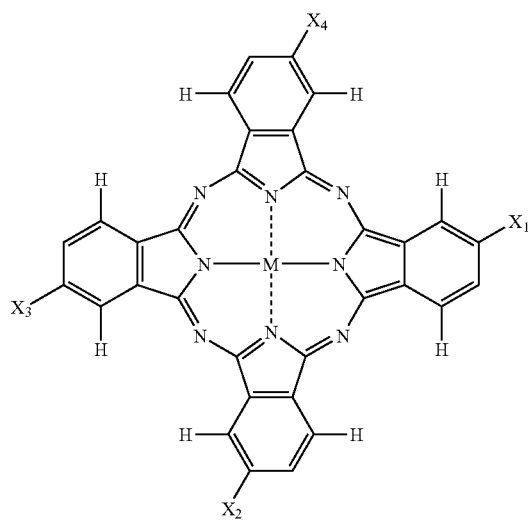

In the synthesis method, when using an identical substituent for all Xp, a β-position substitution type phthalocyanine dye in which $X_{11}, X_{12}, X_{13}$ and $X_{14}$ are quite identical substituents can be obtained. On the other hand, when using different Xp in combination, a dye having identical type of substituents but partly different from each other, or a dye having substituents which are different kinds from each other can be synthesized. Among dyes of the general formula (C-II), those dyes having electron attracting substituents which are different from each other are particularly preferred since the solubility and associative property of a dye and aging stability of an ink can be controlled.

It had been found, in the invention, a electropositive oxidation potential of 0.8 V (vs SCE) or more is extremely important for the improvement of the fastness in any substitution type, and the degree of effectiveness could not expected at all in accordance with the related arts. Further, the hue, light fastness, ozone gas fastness, etc. of the β-substitution type were apparently superior to those of the α, β-position mixed substitution type although detailed reasons are not apparent.

The phthalocyanine dyes represented by the general formulae (C-I) and (C-II) can be synthesized in accordance with the above-described patent documents, and can be synthesized by the method described in Japanese Patent Application Nos. 2001-226275, 2001-96610, 2001-47013, and 2001/193638. The starting materials, dye intermediates and synthesis routs are not restricted to them.

The yellow dye, magenta dye, and cyan dye used in the invention is characterized by having an oxidation potential more electropositive than 0.8V. Phthalocyanines generally used as a cyan dye can ensure fastness even when the oxidation potential thereof is somewhat low since they formed associated form. On the contrary, since the magenta dye does not form association, it is preferred to set the oxidation potential more electropositive than that of the cyan dyes in order to enhance the fastness.

Preferred examples of dyes which can be used in the invention are shown below but, they are only for detailed explanation of the invention, and the invention is not restricted to them. Oxidation potential of the dye is shown in each parenthesis.

A first, specific examples of yellow dyes [Y-1 to Y-35] which can be used in the invention are shown.

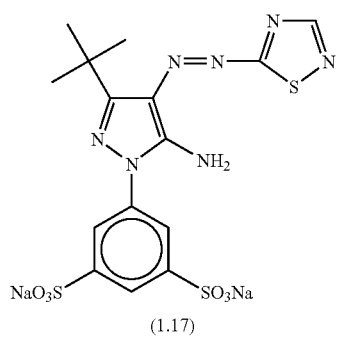

(1.17) Y-1

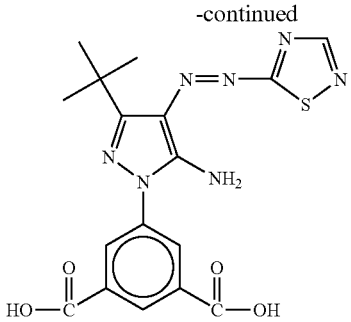

(1.28) Y-2

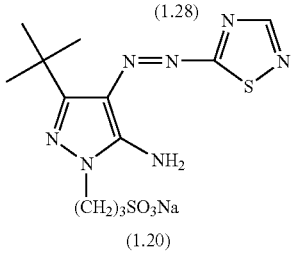

(1.20) Y-3

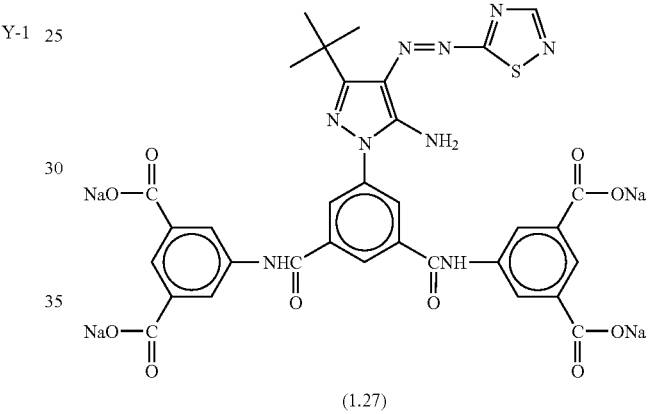

(1.27) Y-4

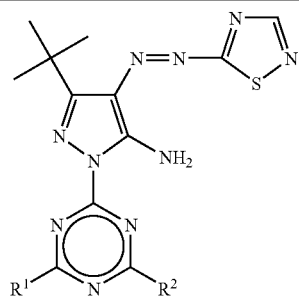

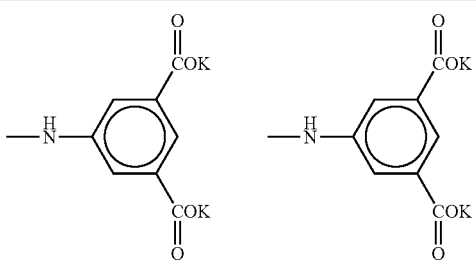

| Compound No. | $R^1$ | $R^2$ | Oxidation potential (V) |
|---|---|---|---|
| Y-5 | ![](COK/COK phenyl NH) | ![](COK/COK phenyl NH) | 1.37 |

-continued
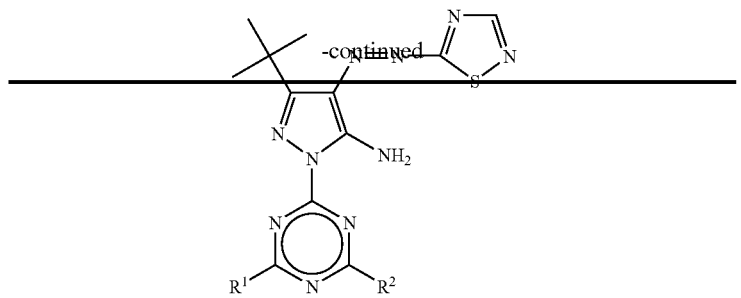
| Compound No. | R¹ | R² | Oxidation potential (V) |
|---|---|---|---|
| Y-6 | —NH(CH₂)₂SO₃Li | —NH(CH₂)₂SO₃Li | 1.34 |
| Y-7 | —NH-C₆H₃(SO₃K)₂ (2,5-disulfo) | —NH-C₆H₃(SO₃K)₂ (2,5-disulfo) | 1.35 |
| Y-8 | —NH-C₆H₄-SO₃Na (4-) | —NH-C₆H₃(CONa)₂ (3,5-dicarboxy) | 1.36 |
| Y-9 | —NH(CH₂)₂SO₃Li | —NH-C₆H₃(COLi)₂ (3,5-dicarboxy) | 1.35 |
| Y-10 | (full pyrazole-azo-thiadiazole with N-methyl) | —NH-C₆H₃(SO₃K)₂ (2,5-disulfo) | 1.39 |

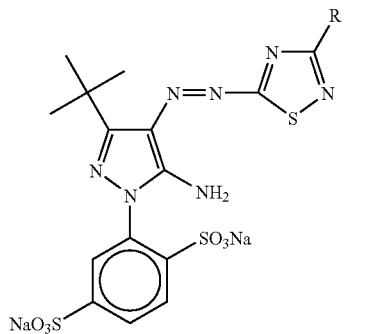
| | | |
|---|---|---|
| Y-11 | R = —S(CH₂)₂SO₃Na | (1.20) |
| Y-12 | R = —Me | (1.19) |
| Y-13 | R = —H | (1.20) |
| Y-14 | R = —Ph | (1.18) |
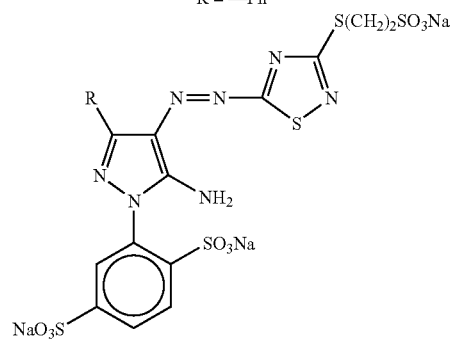
| | | |
|---|---|---|
| Y-15 | R = —Ph | (1.16) |
| Y-16 | R = —OC₂H₅ | (1.16) |
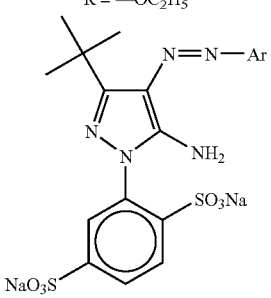
| Y-17 | Ar = [5-methyl-1,3,4-thiadiazol-2-yl] | (1.14) |
|---|---|---|
| Y-18 | Ar = [1,3,4-thiadiazol-2-yl] | (1.20) |
| Y-19 | Ar = [thiazol-2-yl] | (1.05) |
| Y-20 | Ar = [3-methyl-isothiazol-5-yl] | (1.09) |

-continued
Y-21 (1.00)
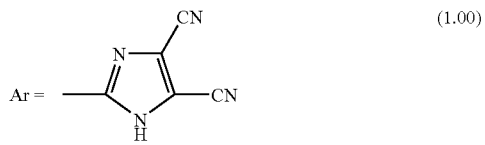
Y-22 (1.00)
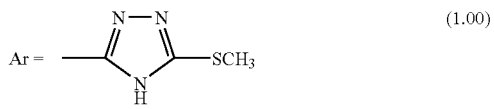
Y-23
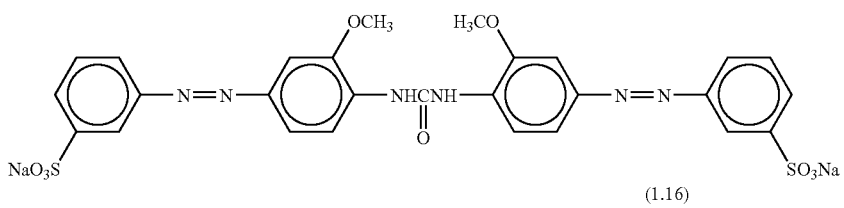
(1.16)
Y-24
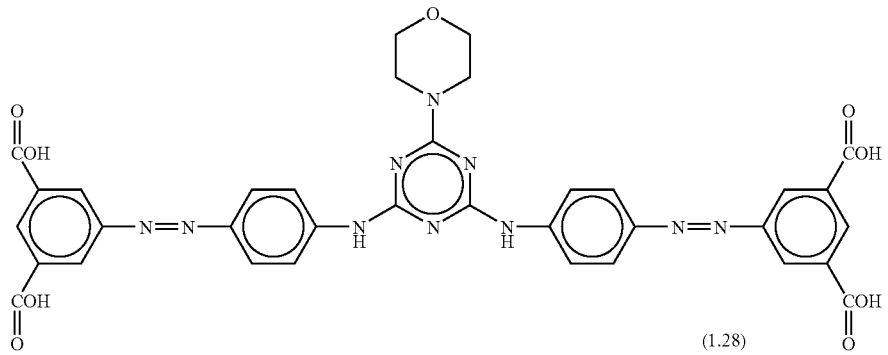
(1.28)
Y-25
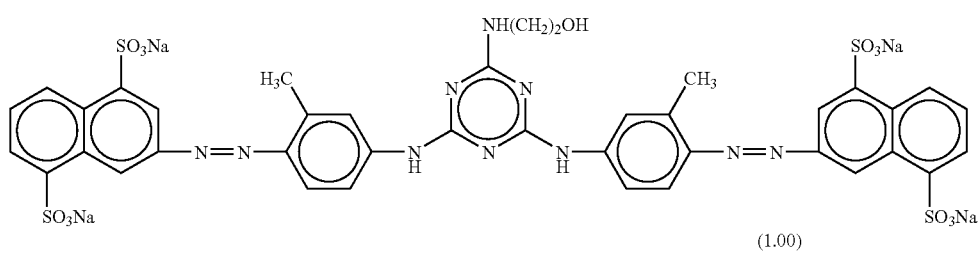
(1.00)
Y-26
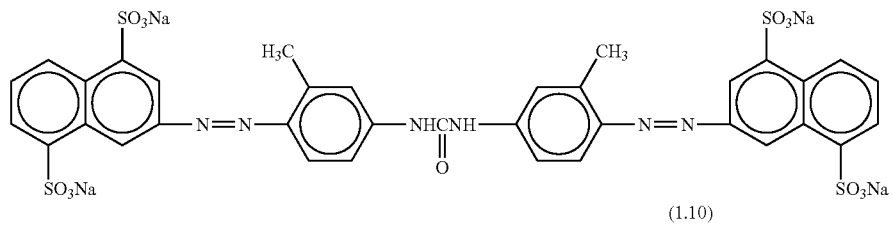
(1.10)

-continued
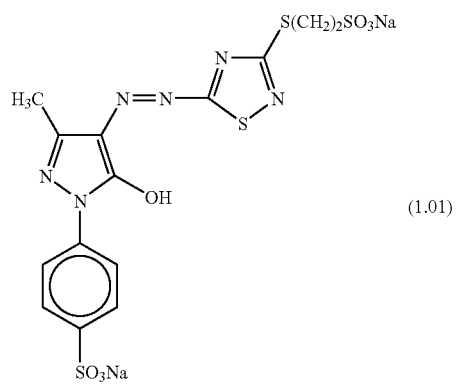
Y-27 (1.01)
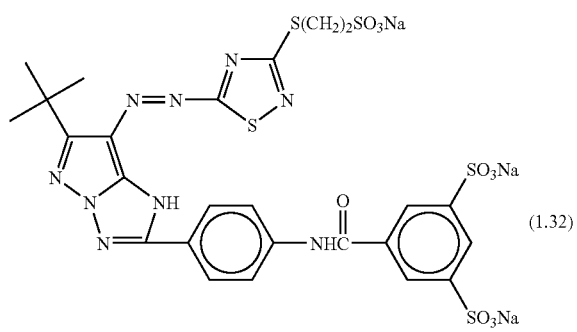
Y-28 (1.32)
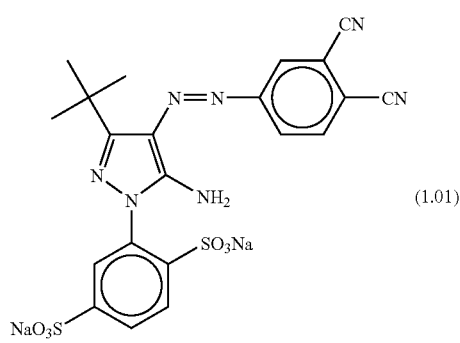
Y-29 (1.01)
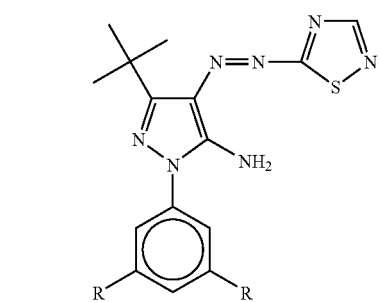
| Y-30 | R = —CON(C$_4$H$_9$)$_2$ | (1.20) |
| Y-31 | R = —CO$_2$C$_8$H$_{17}$ | (1.21) |

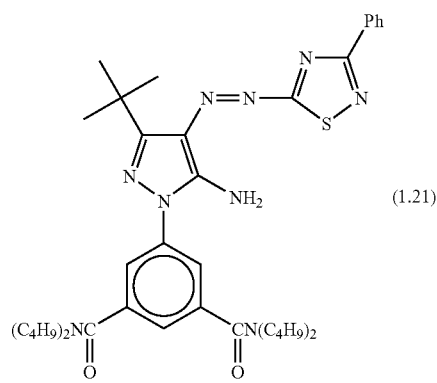
(1.21) Y-32
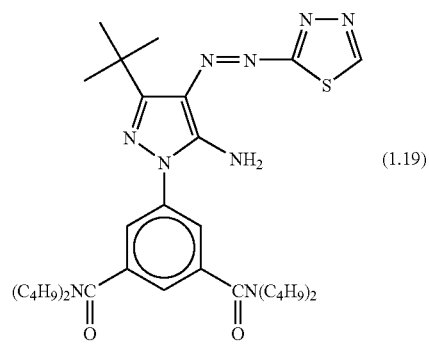
(1.19) Y-33
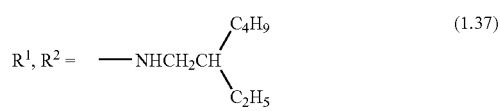
Y-34  R¹, R² = —NHCH₂CH(C₄H₉)(C₂H₅)  (1.37)
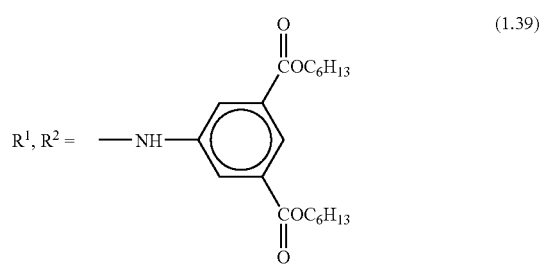
Y-35  R¹, R² = —NH—  (1.39)

Then, specific examples of the magenta dye [M-1 to M-26] that can be used in the invention are set forth below.
M-1
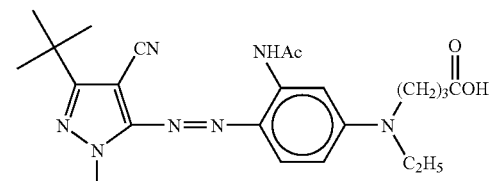
(1.15)
M-2
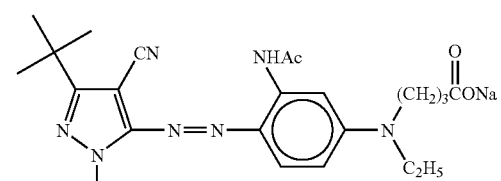
(1.15)
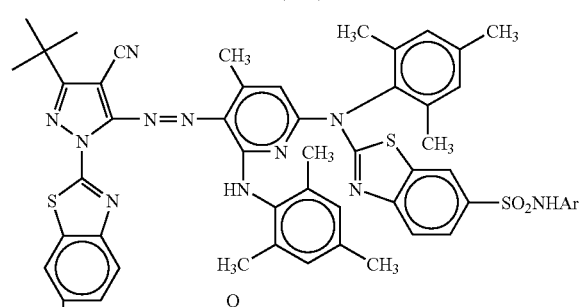
M-3 Ar =
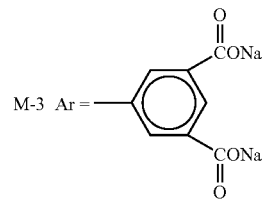
(1.36)
-continued
M-4 Ar =
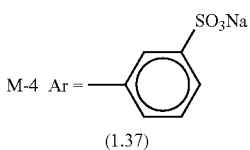
(1.37)
M-5 Ar =
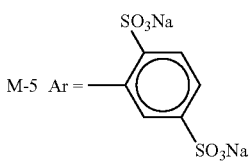
(1.35)
M-6
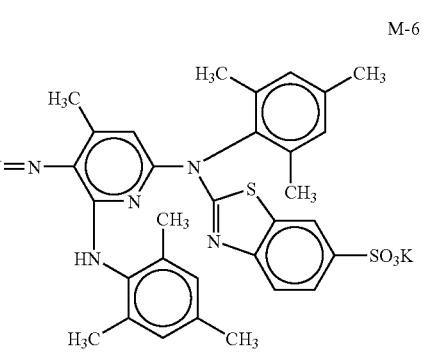
(1.37)
M-7
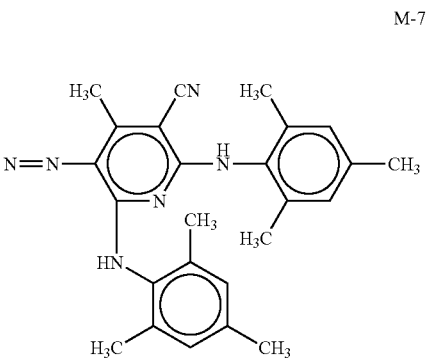
(1.32)

-continued

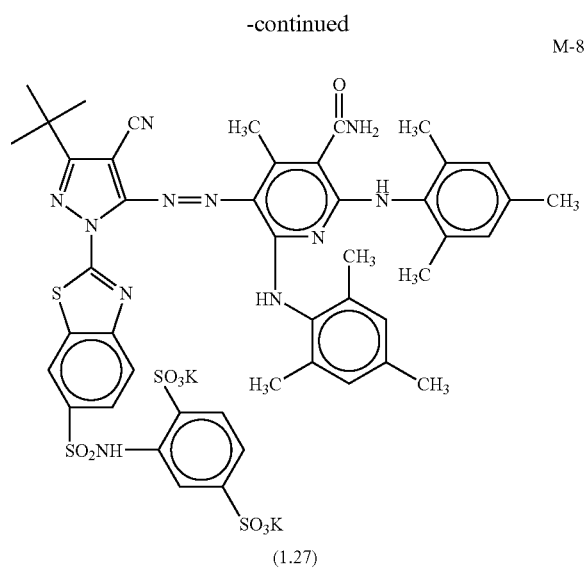

M-8
(1.27)

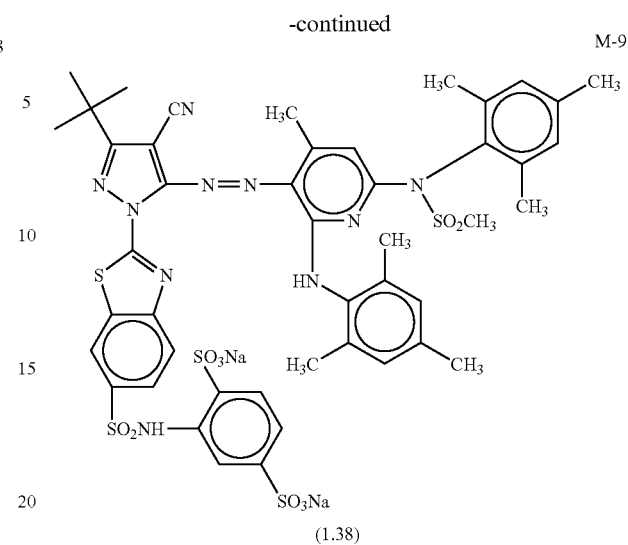

M-9
(1.38)

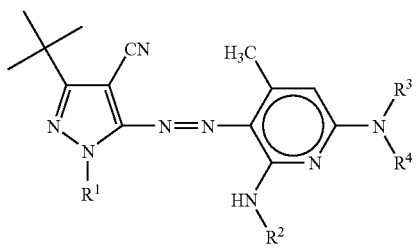

| Compound No. | R¹ | R² | R³ | R⁴ | Oxidation potential (V) |
|---|---|---|---|---|---|
| M-10 | 2-benzothiazolyl-6-SO₃K | 2,3,5-trimethyl-6-SO₃K phenyl | 2-benzothiazolyl-6-SO₃K | 2,3,5-trimethyl-6-SO₃K phenyl | 1.38 |
| M-11 | 2-benzothiazolyl-6-SO₃Na | 2,3-dimethyl-5-SO₃Na phenyl | 2-benzothiazolyl-6-SO₃Na | 2,3-dimethyl-5-SO₃Na phenyl | 1.39 |
| M-12 | 2-benzothiazolyl | 2,3,5-trimethyl-4-SO₃K phenyl | 2-benzothiazolyl | 2,3,5-trimethyl-4-SO₃K phenyl | 1.40 |
| M-13 | 6-chloro-2-benzothiazolyl | 2-methoxy-5-methyl-4-SO₃K phenyl | 2-benzothiazolyl-6-SO₃K | 2-methoxy-5-methyl-4-SO₃K phenyl | 1.39 |

-continued

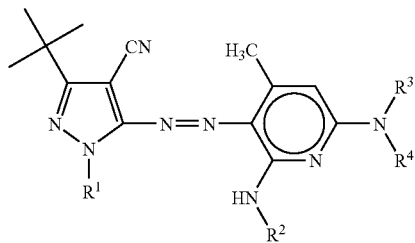

| Compound No. | R¹ | R² | R³ | R⁴ | Oxidation potential (V) |
|---|---|---|---|---|---|
| M-14 | 2-methyl-5-nitrobenzothiazol-yl | 4-methyl-phenyl-SO₃K | 2-methyl-benzothiazol-6-SO₃K | 2-methoxy-4-methyl-phenyl-SO₃K | 1.40 |
| M-15 | 2-methylbenzothiazolyl | 3,4,6-trimethyl-phenyl-2-SO₃K | 2-methylbenzothiazolyl | 3,4,6-trimethyl-phenyl-2-SO₃K | 1.37 |
| M-16 | 2-methylbenzothiazolyl | 3,4,6-trimethyl-phenyl-2-SO₃Na | 2-methyl-benzothiazol-6-SO₃Na | 3,4,6-trimethyl-phenyl-2-SO₃Na | 1.36 |
| M-17 | 2-methylbenzothiazolyl | 3-methyl-phenyl-SO₃Li | 2-methylbenzothiazolyl | 3-methyl-phenyl-SO₃Li | 1.38 |
| M-18 | 2-methylbenzoxazolyl | 3,4,6-trimethyl-phenyl-2-SO₃Li | 2-methylbenzoxazolyl | 3,4,6-trimethyl-phenyl-2-SO₃Li | 1.35 |
| M-19 | 2-methyl-benzoxazol-6-SO₃Li | 3,4,6-trimethyl-phenyl-2-SO₃Li | 2-methyl-benzoxazol-6-SO₃Li | 3,4,6-trimethyl-phenyl-2-SO₃Li | 1.37 |

-continued

| Compound No. | R¹ | R² | R³ | R⁴ | Oxidation potential (V) |
|---|---|---|---|---|---|
| M-20 | 2-benzothiazolyl | 2,4-diethyl-6-methyl-3-(SO₃K)phenyl (C₂H₅, SO₃K, CH₃, C₂H₅) | —SO₂CH₃ | 2,4-diethyl-6-methyl-3-(SO₃K)phenyl (C₂H₅, SO₃K, CH₃, C₂H₅) | 1.38 |

(1.38) M-21

R¹, R² = —NHC(=O)CH(C₂H₅)O-(2,4-di-tert-pentylphenyl)

(1.41) M-22

R¹ = —NHC(=O)CH(C₂H₅)O-(2,4-di-tert-pentylphenyl), R² = H (1.41) M-23

R¹ = H, R² = —SO₂NH(CH₂)₃O-(2-tert-pentyl-4-tert-butylphenyl)

(1.43) M-24

R¹, R² = —SO₂NH(CH₂)₃O-(2-tert-pentyl-4-tert-butylphenyl)

(1.35) M-25

(1.39) M-26

Then, specific examples of the cyan dye [C-1 to C-50] that can be used in the set forth below.

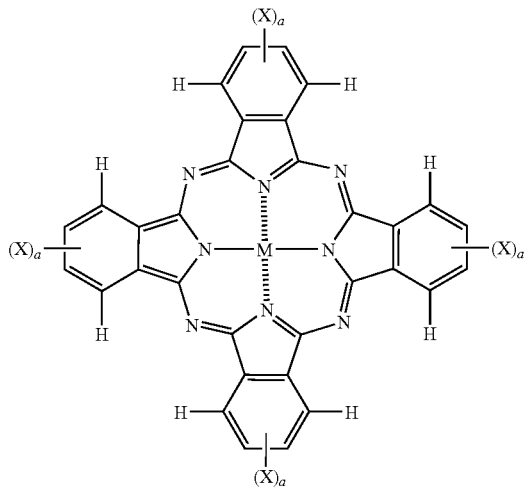

| Compound No. | M | X | ($\sigma_p$ value) | a | Oxidation potential (V) |
|---|---|---|---|---|---|
| C-1 | Cu | —SO$_2$NH—C$_6$H$_4$—NHCO—C$_6$H$_4$(SO$_3$Na) | (0.65) | 1 | 1.24 |
| C-2 | Cu | —SO$_2$N(CH$_3$)—C$_6$H$_4$—SO$_3$Na | (0.65) | 1 | 1.19 |
| C-3 | Cu | —SO$_2$NH—CH$_2$CH$_2$—SO$_3$K | (0.65) | 1 | 1.18 |
| C-4 | Cu | —SO$_2$NH—(CH$_2$)$_3$—N(CH$_2$CH$_2$OH)$_2$ · HCl | (0.65) | 1 | 1.29 |
| C-5 | Cu | —SO$_2$NH—CH$_2$CH$_2$—OC$_2$H$_5$ | (0.65) | 1 | 1.23 |
| C-6 | Cu | —SO$_2$NH—C$_6$H$_3$(CO$_2$Na)$_2$ | (0.65) | 1 | 1.21 |
| C-7 | Cu | —SO$_2$NH—CH$_2$CH$_2$—CO$_2$K | (0.65) | 1 | 1.19 |
| C-8 | Cu | —SO$_2$(CH$_2$)$_3$SO$_2$NH—C$_6$H$_4$—SO$_3$K | (0.77) | 1 | 1.35 |
| C-9 | Cu | —SO$_2$—(benzothiazole-SO$_3$K) | (—) | 1 | 1.36 |
| C-10 | Cu | —SO$_2$—(CH$_2$)$_3$—SO$_3$Na | (0.77) | 2 | 1.39 |
| C-11 | Cu | —SO$_2$—(CH$_2$)$_3$—SO$_3$Li | | 1 | 1.29 |

-continued
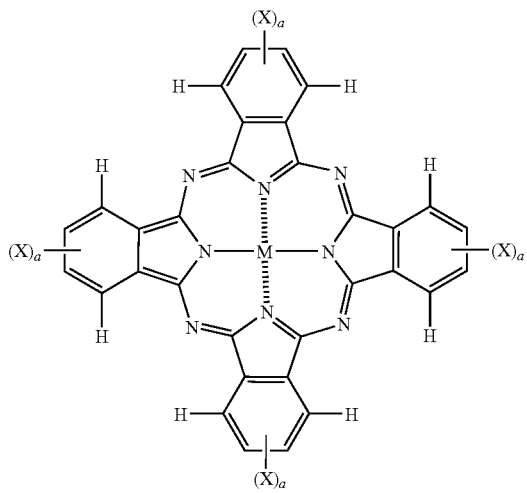
| Compound No. | M | X | ($\sigma_p$ value) | a | Oxidation potential (V) |
|---|---|---|---|---|---|
| C-12 | Cu | —SO$_2$—CH$_2$CH$_2$CH$_2$—SO$_3$K | | 1 | 1.29 |
| C-13 | Cu | —SO$_2$—C$_6$H$_4$—O—(CH$_2$)$_4$—SO$_3$K | (0.68) | 1 | 1.29 |
| C-14 | Cu | —SO$_2$—C$_6$H$_4$—CO$_2$Na (ortho) | (0.68) | 1 | 1.27 |
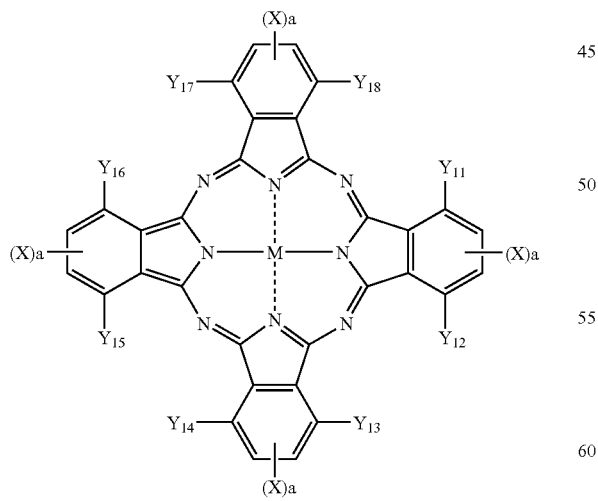
In the table, specific examples for each of combinations (Y11, Y12) (Y13, Y14) (Y15, Y16) (Y17, Y18) are not in order independently.

| Compound No. | M | X | ($\sigma_p$ value) | $Y^{11}, Y^{12}$ | $Y^{13}, Y^{14}$ | $Y^{15}, Y^{16}$ | $Y^{17}, Y^{18}$ | a | Oxidation potential (V) |
|---|---|---|---|---|---|---|---|---|---|
| C-15 | Cu | —SO$_2$NH—C$_6$H$_3$(NHSO$_2$—C$_6$H$_4$—SO$_3$K) | (0.65) | H, Cl | H, Cl | H, Cl | H, Cl | 1 | 1.24 |
| C-16 | Cu | —SO$_2$—(CH$_2$)$_3$—SO$_3$K | (0.77) | H, Cl | H, Cl | H, Cl | H, Cl | 1 | 1.38 |

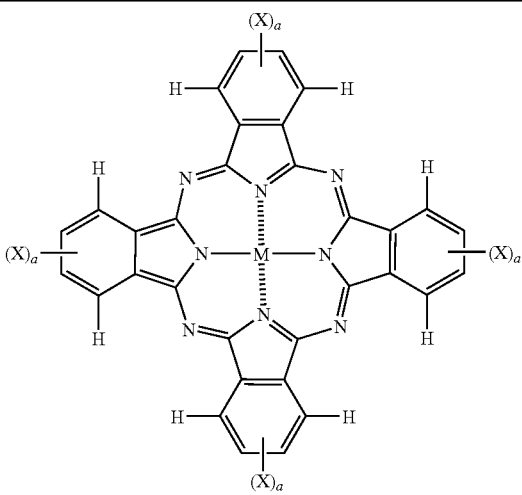

| Compound No. | M | X | ($\sigma_p$ value) | a | Oxidation potential (V) |
|---|---|---|---|---|---|
| C-17 | Cu | —SO$_2$NH—C$_6$H$_4$—C$_8$H$_{17}$-n | (0.65) | 1 | 1.23 |
| C-18 | Cu | —SO$_2$NH—C$_6$H$_3$(CO$_2$C$_6$H$_{13}$-n)(CO$_2$C$_6$H$_{13}$-n) | (0.65) | 1 | 1.25 |
| C-19 | Cu | —SO$_2$NH—C(CH$_3$)$_2$—CH$_2$—C(CH$_3$)$_2$—CH$_3$ | (0.65) | 1 | 1.22 |
| C-20 | Cu | —SO$_2$N(C$_4$H$_9$-n)(C$_6$H$_5$) | (0.65) | 1 | 1.21 |
| C-21 | Cu | —SO$_2$NH—(4-Br-3-t-Bu-pyrazol-5-yl) | (0.65) | 1 | 1.25 |

-continued
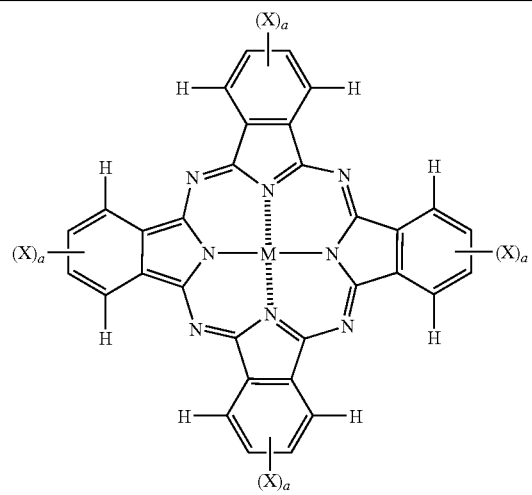
| Compound No. | M | X | ($\sigma_p$ value) | a | Oxidation potential (V) |
|---|---|---|---|---|---|
| C-22 | Cu | —SO$_2$(CH$_2$)$_3$SO$_2$NH(CH$_2$)$_3$OCH(CH$_3$)$_2$ | | 1 | 1.27 |
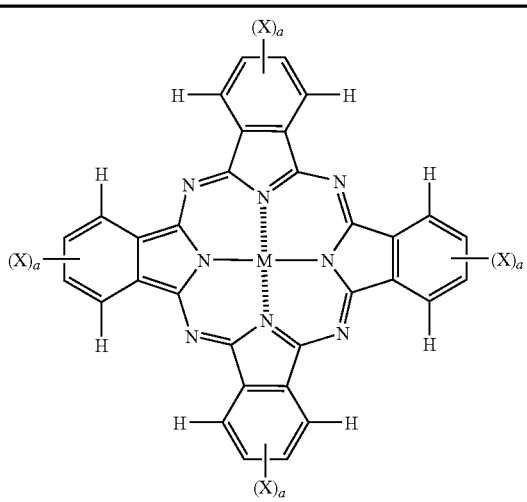
| Compound No. | M | X | ($\sigma_p$ value) | a | Oxidation potential (V) |
|---|---|---|---|---|---|
| C-23 | Cu | —SO$_2$—(2-OC$_4$H$_9$, 5-C$_8$H$_{17}$-t phenyl) | (0.68) | 1 | 1.28 |
| C-24 | Cu | —SO$_2$(CH$_2$)$_3$CO$_2$CH(CH$_3$)CH$_2$OCH$_3$ | | 1 | 1.29 |
| C-25 | Cu | —SO$_2$—C$_{12}$H$_{25}$-n | (0.77) | 1 | 1.28 |

-continued

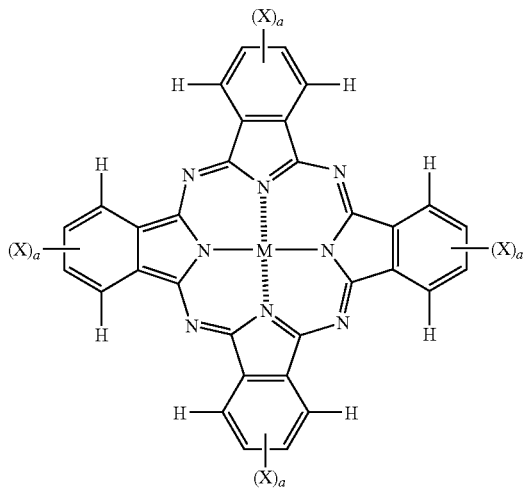

| Compound No. | M | X | ($\sigma_p$ value) | a | Oxidation potential (V) |
|---|---|---|---|---|---|
| C-26 | Cu | —SO$_2$—(CH$_2$)$_2$NHCCH(C$_2$H$_5$)(C$_4$H$_9$) with C=O | (0.77) | 1 | 1.28 |
| C-27 | Cu | —SO$_2$—(CH$_2$)$_2$CO$_2$C$_6$H$_{13}$-n | (0.77) | 1 | 1.31 |
| C-28 | Cu | —SO$_2$—C$_8$H$_{17}$-n | (0.77) | 2 | 1.36 |

Cu-Pc-(SO$_2$R$^1$)$_m$ (SO$_2$R$^2$)$_n$

| Compound No. | R$^1$ | ($\sigma_p$) | R$^2$ | ($\sigma_p$) | m:n | Oxidation potential (V) |
|---|---|---|---|---|---|---|
| C-29 | —C$_{12}$H$_{25}$(n) | (0.77) | —C$_8$H$_{17}$(n) | | 1:3 | 1.28 |
| C-30 | —C$_8$H$_{17}$(n) | (0.77) | —C$_6$H$_4$—OC$_4$H$_9$(n) | (0.68) | 2:2 | 1.29 |
| C-31 | —(CH$_2$)$_2$CO$_2$C$_6$H$_{13}$(n) | (0.77) | 2-OC$_4$H$_9$-4-CH$_3$-C$_6$H$_3$— | (0.68) | 1:3 | 1.30 |
| C-32 | 2-OC$_4$H$_9$-4-C$_8$H$_{17}$(t)-C$_6$H$_3$— | (0.68) | —C$_6$H$_4$—OCH$_3$ | (0.68) | 3:1 | 1.32 |
| C-33 | —C$_6$H$_4$—C$_{12}$H$_{25}$ | (0.68) | —C$_4$H$_9$(n) | (0.77) | 2:2 | 1.30 |

-continued $Cu\text{-}Pc\text{-}(SO_2R^1)_m(SO_2R^2)_n$

| Compound No. | $R^1$ | $(\sigma_p)$ | $R^2$ | $(\sigma_p)$ | m:n | Oxidation potential (V) |
|---|---|---|---|---|---|---|
| C-34 | ―⟨C₆H₄⟩―C₁₂H₂₅ (para-dodecylphenyl) | | ―C₄H₉(n) | | 1:3 | 1.30 |

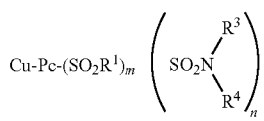

| Compound No. | $R^1$ | $(\sigma_p)$ | ―N(R³)(R⁴) | $(\sigma_p)$ | m:n | Oxidation potential (V) |
|---|---|---|---|---|---|---|
| C-35 | ―C₈H₁₇(n) | (0.77) | ―NHCH₂CH(C₄H₉(n))(C₂H₅) | (0.65) | 3:1 | 1.29 |
| C-36 | ―C₈H₁₇(n) | | ―N(C₈H₁₃(n))₂ | (0.65) | 1:3 | 1.25 |
| C-37 | ―C₈H₁₇(n) | | ―NH(CH₂)₃O―⟨2,4-di-t-butylphenyl⟩ | (0.65) | 3:1 | 1.28 |
| C-38 | 3-methyl-4-butoxy-phenyl with C₈H₁₇(t) | (0.68) | ―NH(CH₂)₂OC₂H₅ | (0.65) | 1:3 | 1.26 |
| C-39 | 3-methyl-4-butoxy-phenyl with C₈H₁₇(t) | | ―NHCH₂CO₂C₈H₁₇(n) | (0.65) | 2:2 | 1.28 |

$Cu\text{-}Pc\text{-}(SO_2R^1)_m(SO_2R^2)_n$

| Compound No. | $R^1$ | $(\sigma_p)$ | $R^2$ | $(\sigma_p)$ | m:n | Oxidation potential (V) |
|---|---|---|---|---|---|---|
| C-40 | ―(CH₂)₃SO₃Li | | ―(CH₂)₃SO₂NHCH₂CH(OH)CH₃ | | 3:1 | 1.31 |

-continued $Cu\text{-}Pc\text{-}(SO_2R^1)_m(SO_2R^2)_n$

| Compound No. | $R^1$ | $(\sigma_p)$ | $R^2$ | $(\sigma_p)$ | m:n | Oxidation potential (V) |
|---|---|---|---|---|---|---|
| C-41 | —$(CH_2)_3SO_3Li$ | | —$(CH_2)_3SO_2NHCH_2CH(OH)CH_3$ | | 2:2 | 1.31 |
| C-42 | —$(CH_2)_3SO_3Li$ | | —$(CH_2)_3SO_2NH(CH_2)_2O(CH_2)_2OH$ | | 2:2 | 1.30 |
| C-43 | —$(CH_2)_3SO_3K$ | | 2-CO$_2$K-phenyl | | 1:3 | 1.32 |
| C-44 | —$(CH_2)_3SO_3K$ | | 2-CO$_2$K-phenyl | | 3.5:0.5 | 1.30 |
| C-45 | —$(CH_2)_2NHCO(CH_2)_2CO_2Na$ | (0.77) | —$(CH_2)_3SO_3Na$ | (0.77) | 2:2 | 1.30 |
| C-46 | —$(CH_2)_2NHCO(CH_2)_2CO_2Na$ | | —$(CH_2)_3SO_3Na$ | | 1:3 | 1.30 |
| C-47 | —$(CH_2)_2NHSO_2$-phenyl-CO$_2$Na | (0.77) | —$(CH_2)_3SO_3Na$ | | 1:3 | 1.31 |
| C-48 | —$(CH_2)_2N(CH_2CO_2Na)_2$ | | —$(CH_2)_3SO_3Na$ | | 2:2 | 1.32 |

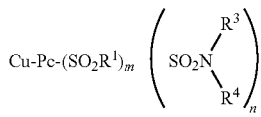

$$Cu\text{-}Pc\text{-}(SO_2R^1)_m\left(SO_2N\begin{matrix}R^3\\R^4\end{matrix}\right)_n$$

| Compound No. | $R^1$ | —N(R³)(R⁴) | $(\sigma_p)$ | m:n | Oxidation potential (V) |
|---|---|---|---|---|---|
| C-49 | —$(CH_2)_3SO_3K$ | —$NH(CH_2)_2SO_3K$ | (0.65) | 3:1 | 1.29 |
| C-50 | —$(CH_2)_3SO_3K$ | —$NH(CH_2)_2SO_3K$ | | 2:2 | 1.28 |

Black Dye

Water Soluble Short Wavelength Dye

The water soluble short wavelength dye used in the invention is a dye having an absorption maximum at 440 to 540 nm with a half-value width of 90 nm to 200 nm in a visible region absorption spectrum in an aqueous solvent and attaining broad absorption. The aqueous solvent means a medium comprising water as a main solvent and appropriately containing a water miscible organic solvent optionally for dissolving or dispersing the dye. Further, the absorption spectrum means that is measured by a spectral photometer by using a 1 cm cell ordinary used. They are identical also for the water soluble long wavelength dye L to be described later.

The absorption spectrum of the water soluble short wavelength dye S is measured by using a single compound. That is, the water soluble short wavelength dye according to the invention does not show the physical property such as desired absorption maximum and half-value width by the combination of a plurality of compounds in a case of measuring absorption spectrum in an aqueous solvent but this means that such physical property is shown by a single compound. In the invention, it will be apparent that compounds of structures different from each other may also be used in combination so short as they satisfy the absorption spectrum as the water soluble short wavelength dye S (hereinafter also referred to as "short wavelength dye S"). Further, in the invention other short wavelength dye than the short wavelength dye S showing the absorption spectral characteristic described above may also be used in combination.

Since the short wavelength dye S has such absorption characteristic, it can absorb lights over a wide range from blue color to green color which tend to be insufficient in the absorption spectrum of the water soluble long wavelength dye L such as disazo dye or trisazo dye and has favorable absorption characteristic as the color compensation dye.

The absorption maximum of the short wavelength dye S is preferably between 450 and 520 nm and, particularly preferably, between 460 to 500 nm.

The half-value width of the short wavelength dye S is preferably, between 100 nm and 180 nm and, particularly preferably, between 110 nm and 160 nm.

Further, the short wavelength dye S according to the invention preferably has no dissociative phenolic hydroxyl group present in usual dyes and such a structure can provide a favorable performance with less change of tone depending on the image forming material to be used and excellent in the gas resistance being less reactive to oxidative gases such as ozone in air.

The dissociative phenolic hydroxyl group means a dissociative hydroxyl group which is substituted on an aryl group. The aryl group may be substituted with other substituent.

Further, the short wavelength dye S according to the invention preferably has 2 to 6 azo groups in one molecule and such structure can enhance the color forming property and can provide images of good fixing property since the plane of the dye extends largely.

Further, the number of the azo dyes in one molecule is more preferably from 4 to 6 with the view point of the color forming property and the fixing property.

The short wavelength dye S is not particularly limited so long as it has the property as defined in the present specification and can solve the subject described above, and can include polyazo dyes represented by the following general formula:

(D)$_n$-Y

In the general formula, D represents a dye residue comprising a color forming group constituted with 3 to 4 aromatic rings having 1 to 3 azo group conjugated to each other and having 20 or more π electrons in total, n is 1 or 2 in which Y represents a hydrogen atom when n is 1 and Y represents a bivalent connection group when n is 2. The aromatic ring constituting the color forming group may be either a heterocyclic ring or a hydrocarbon ring and is preferably a hydrocarbon ring. In a case where the aromatic ring constituting the color forming group is a condensed ring the number of n electrons on the aromatic ring means the number of π electrons on the entire condensed ring and, for example, a naphthalene ring has π electrons by the number of 10. The bivalent connection group represented by Y includes an alkylene group, arylene group, heterocyclic ring residue, —CO—, —SO$_n$— (n is 0, 1, or 2), —NR— (R represents hydrogen atom, alkyl group, aryl group, etc.), —O—, and a bivalent group formed by combining the connection groups and they may further have a substituent such as an alkyl group, aryl group, alkoxy group, amino group, acyl group, acylamino group, halogen atom, hydroxy group, carboxyl group, sulfamoyl group, carbamoyl group, sulfoneamide group, etc. Among them, preferred examples of the connection group include —NH—CO—NH—, —NH—CS—NH—, and the group of the following general formula.

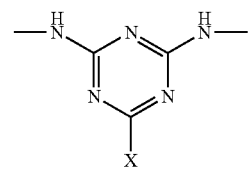

In the general formula, X represents a hydroxyl group, sulfo group, alkoxy group, aryloxy group, amino group (including alkylamino group and arylamino group), or an alkyl or arylsulfenyl group, and each group may further have a substituent.

For example, as the short wavelength dye S, commercially available C. I. Direct Red 84, brown 106, and brown 202 are useful and, among them, C. I. Direct Red 84 that can be used for tone control of various black dyes and is excellent also in the color forming property, fastness and fixing property is particularly useful.

Further, while examples of the short wavelength dyes S used preferably in the invention are to be shown below as the structure of free acid, they can also be used in the form of any of salts thereof.

Preferred counter cation includes alkali metals (for example, lithium, sodium, and potassium), ammonium, and organic cations (for example, pyridinium, tetramethyl ammonium, and guanidium).

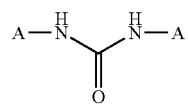

A

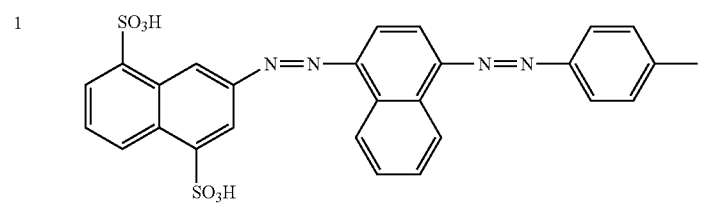

1

| | -continued |
|---|---|
| | 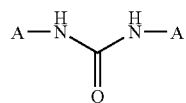 |
| | A |
| 2 | 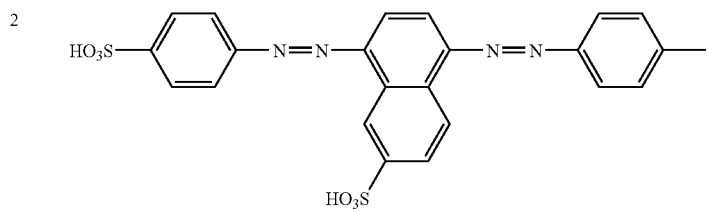 |
| 3 | 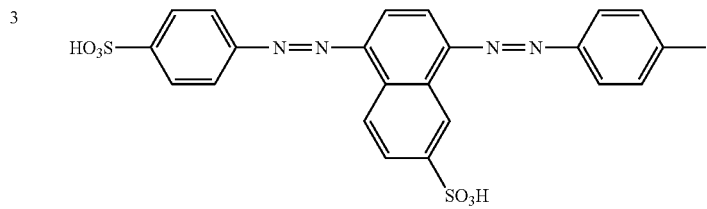 |
| 4 | 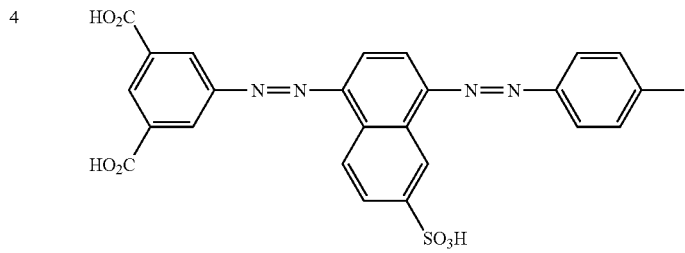 |
| 5 | 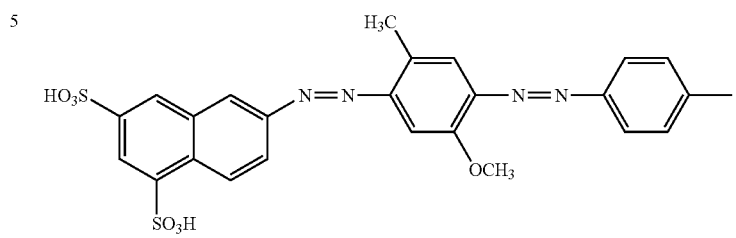 |
| 6 | 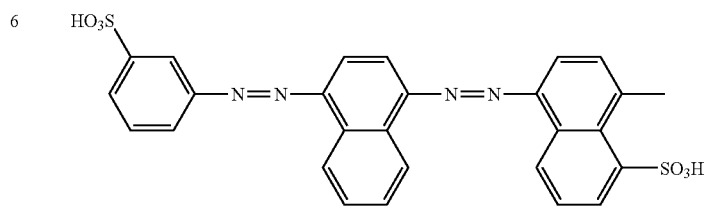 |

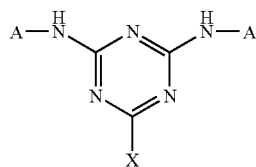

| | A | X |
|---|---|---|
| 7 | (naphthalene-1,5-disulfonic acid)–N=N–(naphthalene)–N=N–(4-methylphenyl) | —NHC₂H₄OH |
| 8 | (4-sulfophenyl)–N=N–(naphthalene-6-sulfonic acid)–N=N–(4-methylphenyl) | —NHC₂H₄OH |
| 9 | (4-sulfophenyl)–N=N–(naphthalene-7-sulfonic acid)–N=N–(4-methylphenyl) | —NHC₂H₄OH |
| 10 | (4-sulfophenyl)–N=N–(naphthalene-7-sulfonic acid)–N=N–(4-methylphenyl) | —N(C₂H₄OH)₂ |
| 11 | (naphthalene-1,6-disulfonic acid)–N=N–(2-methyl-5-methoxyphenyl)–N=N–(4-methylphenyl) | —N(C₂H₄OH)₂ |
| 12 | (3-sulfophenyl)–N=N–(naphthalene)–N=N–(4-methyl-8-sulfonaphthalene) | —NHC₂H₄OH |

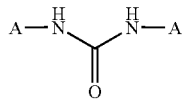

A

13
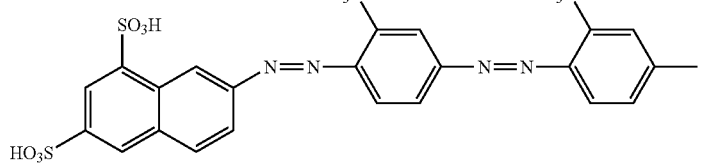

14
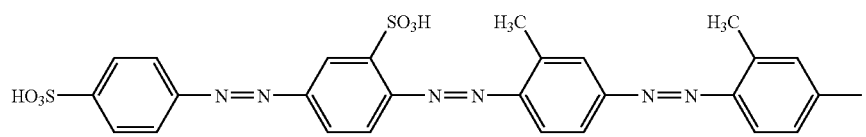

15
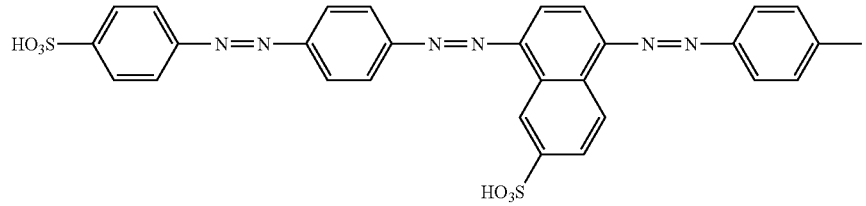

Among them, since C. I. Direct Red 84 (Na salt of the compound example 2 described above) and Brown 106 (Na salt of the compound example 14 described above) are available as commercial dyes, they are preferred. Particularly, C. I. Direct Red 84 that can be used for the tone control of various black dyes and is also excellent in the color forming property, fastness and fixing property is particularly useful.

Also the short wavelength dyes S other than the commercial dyes can be synthesized easily from commercial raw materials in accordance with the synthesis route for C. I. Direct Red 84 or Brown 106 described in the color index vol. 4 (published from The Society of Dyers and Colorists)

The black ink composition of the invention contains the short wavelength dye in the ink by from 0.1 to 4 mass % (in this specification, "mass %" is equal to "weight %"), preferably, from 0.5 to 3.0 mass % and, particularly preferably from 1.0 to 2.5 mass %, which can be changed properly as desired.

Water Soluble Long Wavelength Dye L

The black ink composition of the invention contains a water soluble long wavelength dye L having the maximum for absorption spectrum (absorption maximum) at 550 to 700 nm and a half-value width of 100 nm or more in an aqueous solvent (preferably 120 to 500 nm and more preferably 120 to 350 nm). Further, by using the water soluble long wavelength dye in combination with the short wavelength dye S, favorable black tone can be obtained.

The absorption spectrum of the water soluble long wavelength dye L is measured by using a single compound. That is, the water soluble long wavelength dye according to the invention does not show the physical property such as desired absorption maximum and half-value width by the combination of a plurality of compounds in a case of measuring absorption spectrum in an aqueous solvent but this means that such physical property is shown by a single compound. In the invention, it will be apparent that compounds of structures different from each other may also be used in combination so long as they satisfy the absorption spectrum as the water soluble long wavelength dye L (hereinafter also referred to as "long wavelength dye L"). Further, in the invention other long wavelength dye than the long wavelength dye L showing the absorption spectral characteristic described above may also be used in combination.

The long wavelength dye preferably has 2 to 4 azo groups conjugated to each other in one molecule.

Further, it is preferred that the long wavelength dye L has a hydroxyl group at the conjugation position to the azo group or the number of the heterocyclic ring in the color forming group is one or less in order to ensure the high color forming property, the absorption characteristic with broad half-value width suitable to the black tone, and the ink stability, although the reason therefore is not apparent. The conjugation position means a position for substitution in a relation conjugate to the azo group, and the hydroxyl group preferably substitutes at the ortho- or para-position to the substitution position of the azo group.

Generally, since a dye having a hydroxyl group at the conjugation position for the azo group is sometimes poor in the fastness to light or active gases in air depending on the kind of image receiving materials and the storing conditions of printed maters, those having associative property and having a property capable of physically suppressing reaction are further preferred as the long wavelength dye.

Whether a dye is in an associated state or not can be judged easily by measuring the visible absorption spectrum while changing the concentrations of the dye, judging whether the dye has the associative property or not by inspecting the change of the absorption maximum wavelength, molar absorption coefficient, and waveform and by comparison between the properties of the solution and the absorption spectrum of the dye on the image receiving material.

Specifically, it is preferred to use such a dye for which a relation: $\epsilon 1/\epsilon 2 > 1.2$ is established between a molar absorption coefficient ($\epsilon 1$) at the maximum wavelength of the visible region absorption measured for an aqueous solution of dye at 0.1 mmol/L using a cell of 1 cm optical channel length and a molar absorption coefficient ($\epsilon 2$) at the maximum wavelength of the visible region absorption measured for an aqueous solution of the dye at 0.2 mol/L using a liquid crystal cell of 5 μm optical channel length as defined in Japanese Patent Application No. 2004-65569.

Among the long wavelength dyes L used preferably in the invention, those having the following general formulae are particularly preferred.

While the dyes are shown as the structure of free acids in the following general formulae, they can be also used in the form of any of salts thereof in actual use.

or general formula 2 are preferred and the dyes of the general formula 1 are particularly preferred. In the dyes of the general formula 1, a dye in which X is the amino group or the hydroxyl group is preferred and the dye having the hydroxyl group is particularly preferred. Further, with a view point of the fastness, those in which an electron attracting group is substituted in the dye, or in which any one of $A_1$, $A_2$, B is a heterocyclic ring is preferred. Furthermore, those in which n is 1 to 3 is preferred and in which n is 2 is particularly preferred, and those in which m is 1 to 3 is preferred and in which m is 1 is particularly preferred.

A preferred electron attracting group includes, for example, a nitro group, cyano group, halogen atom, sulfamoyl group, carbamoyl group, and ester group.

Examples of preferred heterocyclic rings include pyrazole, thiazole, isothiazole, oxazole, isooxazole, and pyridine, which may have a condensed ring.

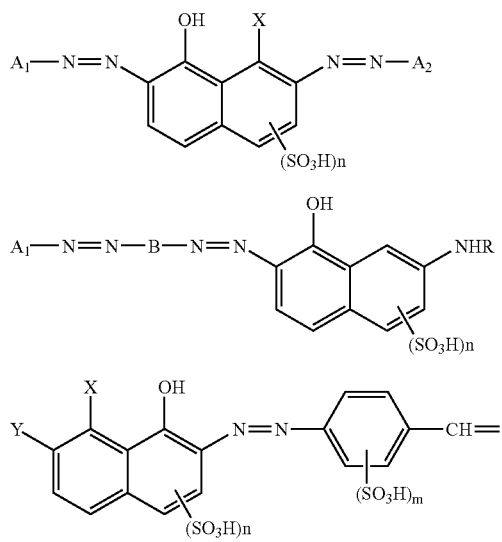

Formula 1

Formula 2

Formula 3

In the general formulae 1 to 3, in a case where substituents represented each by an identical symbol are present in plurality in one identical molecule, they may be identical or different with each other. X represents an amino group, hydroxyl group or hydrogen atom. Y represents a hydrogen atom or amino group. R represents a hydrogen atom, or an alkyl group (including aralkyl group), aralkyl group, alkenyl group, aryl group, heterocyclic group, acyl group, or sulfonyl group which may have a substituent. The substituent which may be present includes, typically, a halogen atom, ionic hydrophilic group (sulfo group, carboxy group, etc), alkoxy group, hydroxyl group, acylamino group, acyl group, carbamoyl group, sulfamoyl group, etc. n and m each represents an integer of 0 to 3, and the sulfo group may substitute at any position on the benzene ring or naphthalene ring. $A_1$ and $A_2$ each represents a monovalent aromatic group or heterocyclic group. B represents a bivalent aromatic group or heterocyclic group. $A_1$ or $A_2$ may be further substituted with an azo group. $A_1$, $A_2$, or B may have a further substituent. The number of the heterocyclic ring contained in the color forming group of the dye is preferably 1 or less. Further, a portion of the dye represented by the general formula may be dissociated to form a chelate dye in which a transition metal is coordinated.

Among the dyes represented by the general formulae described above, those represented by the general formula 1

Particularly preferred compounds of the general formula 1 are compounds represented by the following general formula (4).

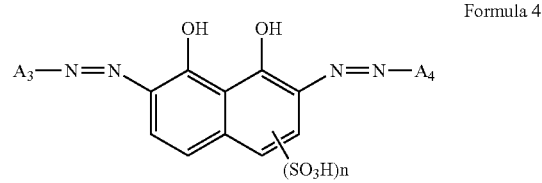

Formula 4

In the general formula 4, $A_3$ and $A_4$ each represents independently a heterocyclic ring group or an aryl group represented by the general formula 5. n represents an integer of 0 to 3.

Formula 5

In the general formula 5, EWB (Electron Withdrawing Group) is an electron attracting group selected from the group consisting of a nitro group, cyano group, azo group, sulfamoyl group, carbamoyl group, and ester group and, preferably, a nitro group or azo group. Z represents a substituent selected from an alkyl group, alkoxy group, sulfo group, carboxyl group, amino group, and acylamino group. The substituent represented by EWG or Z may also have a further substituent. p represents an integer of 0 to 4. q represents an integer of 0 to 3 and, preferably, represents 1 or 2.

Further, while preferred examples of the long wavelength dyes L are to be shown below as the structure of free acids, they can also be used in the form of any of salts thereof.

Preferred counter cation includes alkali metals (for example, lithium, sodium, and potassium), ammonium, and organic cations (for example, pyridinium, tetramethyl ammonium, and guanidium).

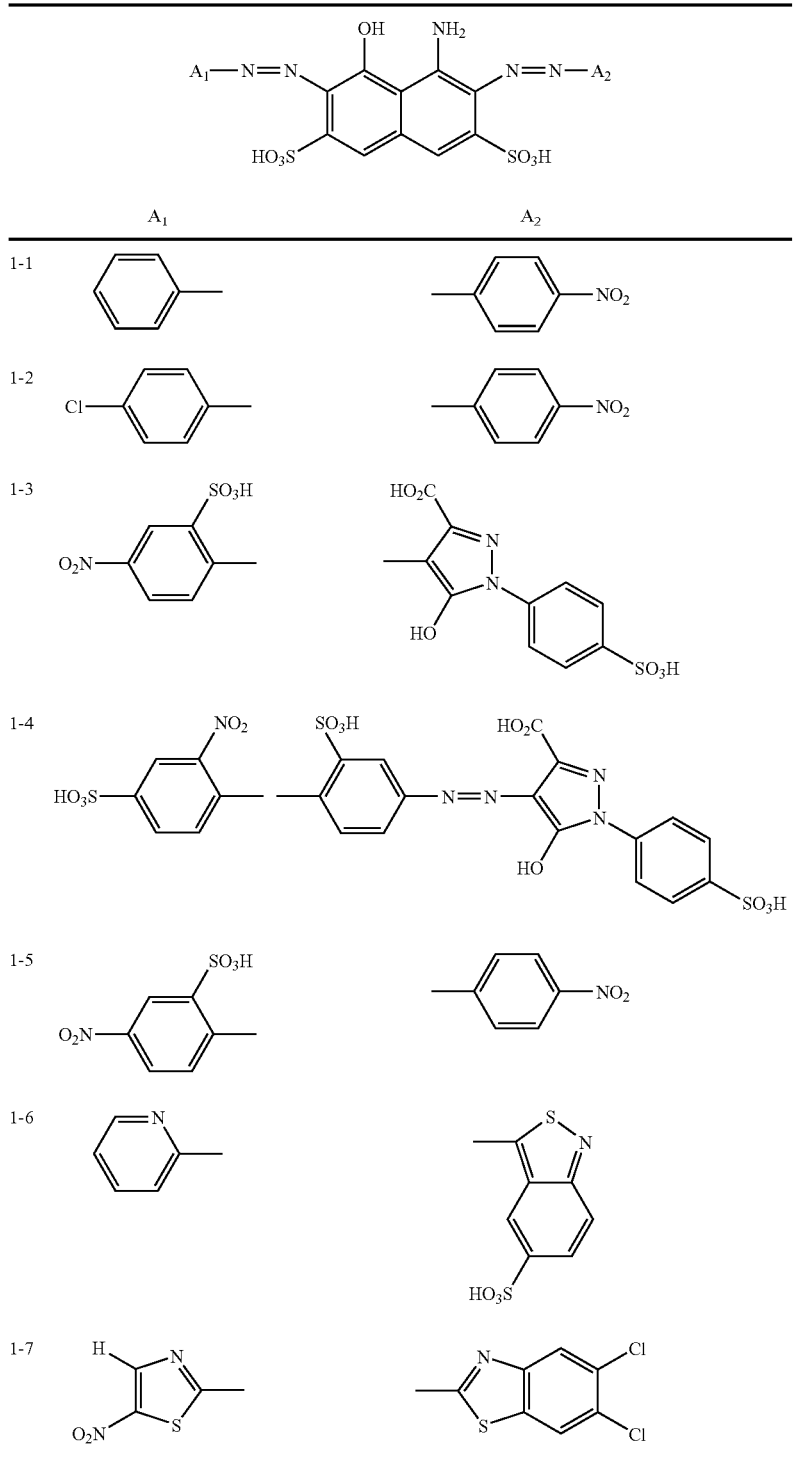

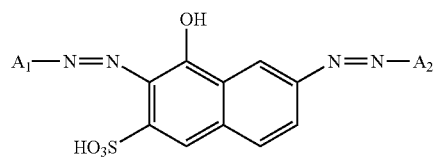
| | $A_1$ | $A_2$ |
|---|---|---|
| 1-8 | 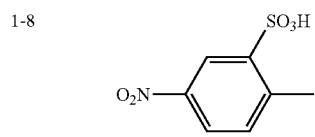 | 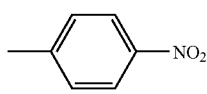 |
| 1-9 | 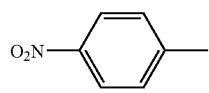 | 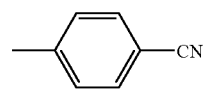 |
| 1-10 | 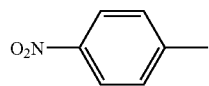 | 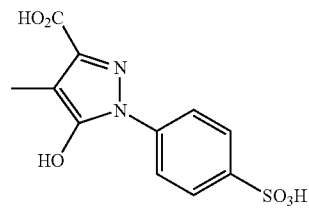 |
| 1-11 | 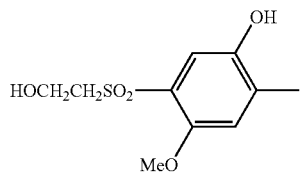 | 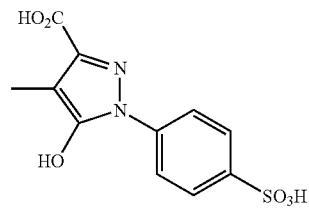 |
| 1-12 | 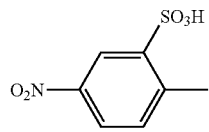 | 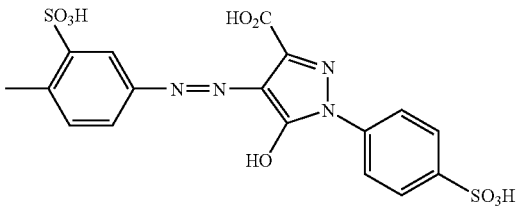 |
| 1-13 | 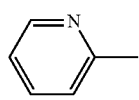 | 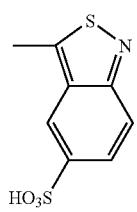 |

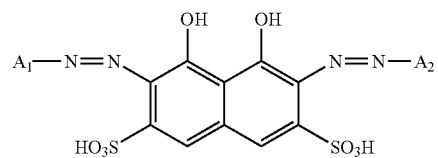
| | $A_1$ | $A_2$ |
|---|---|---|
| 1-14 | 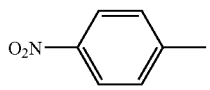 | 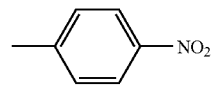 |
| 1-15 | 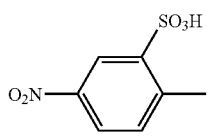 | 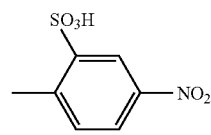 |
| 1-16 | 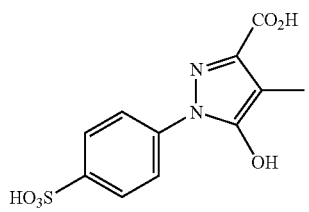 | 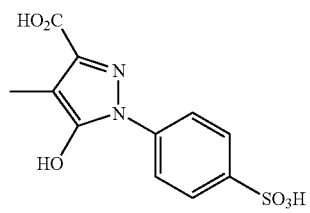 |
| 1-17 | 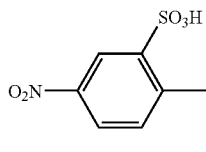 | 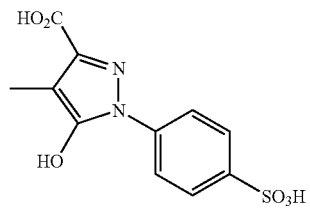 |
| 1-18 | 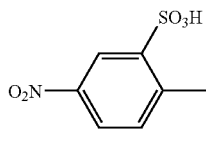 | 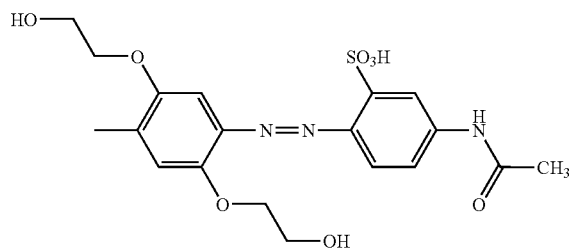 |
| 1-19 | 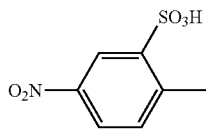 | 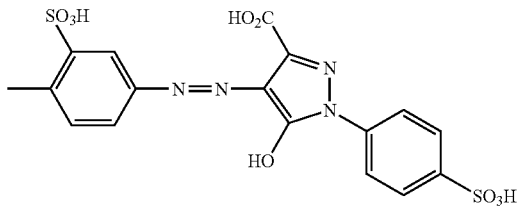 |

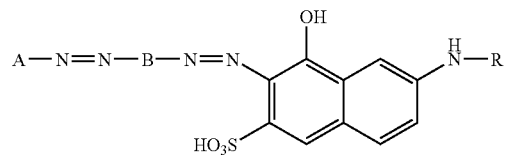
| | A | B | R |
|---|---|---|---|
| 2-1 | 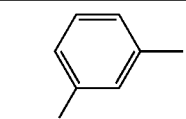 | 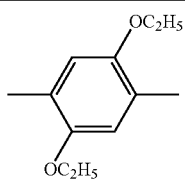 | H |
| 2-2 | 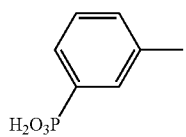 | 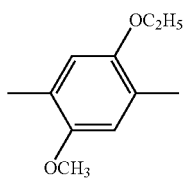 | H |
| 2-3 | 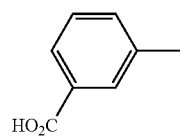 | 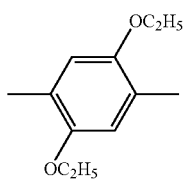 | H |
| 2-4 | 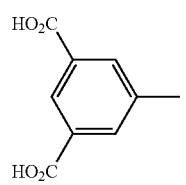 | 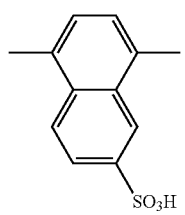 | H |
| 2-5 | 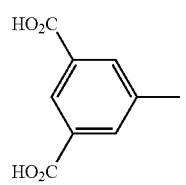 | 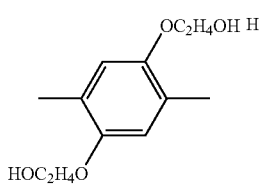 | H |
| 2-6 | 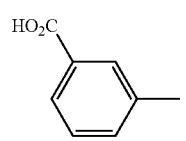 | 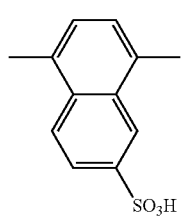 | —CH$_2$CO$_2$H |
| 2-7 | 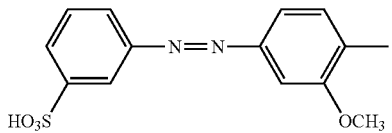 | 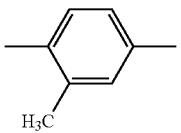 | 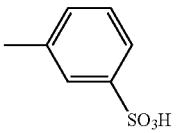 |

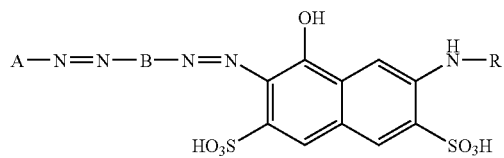
| | A | B | R |
|---|---|---|---|
| 2-8 | 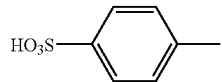 | 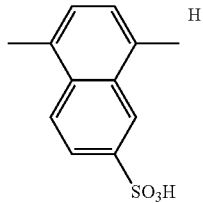 | H |
| 2-9 | 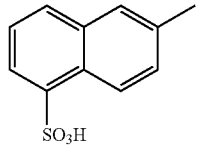 | 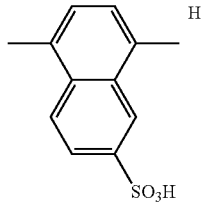 | H |
| 2-10 | 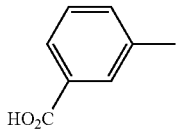 | 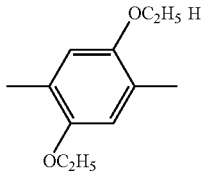 | H |
| 2-11 | 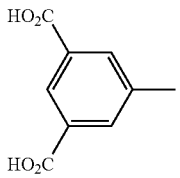 | 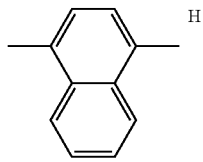 | H |
| 2-12 | 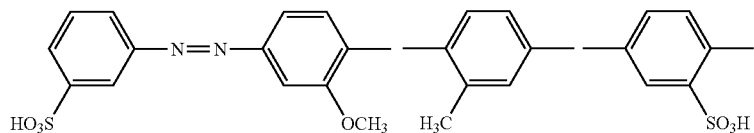 | | |
| 2-13 | 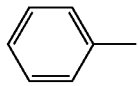 | 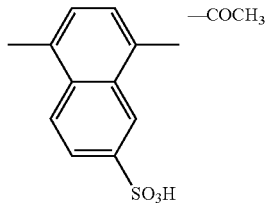 | —COCH$_3$ |

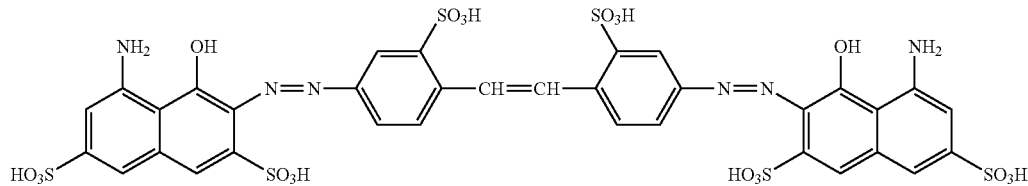

3-1

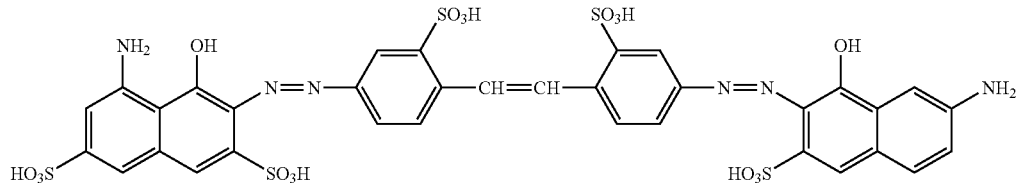

3-2

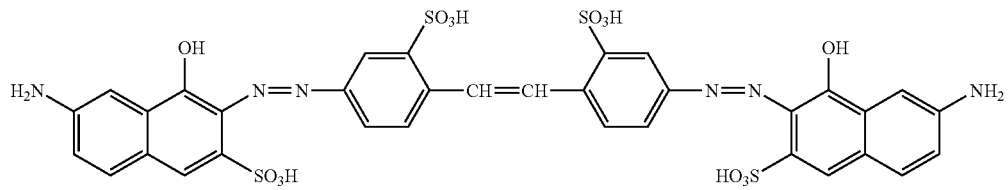

3-3

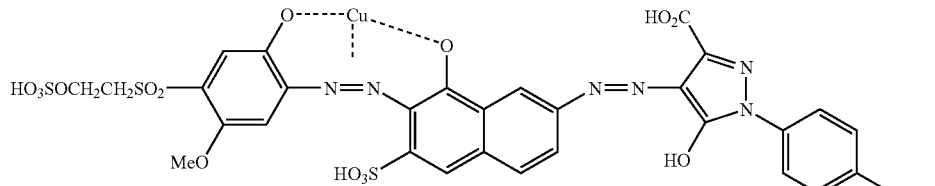

4-1

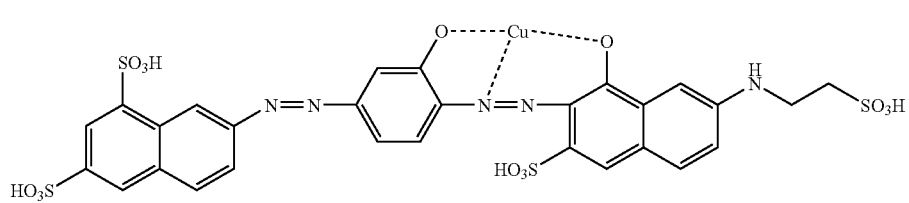

4-2

In addition to the dyes represented by the formulae described above, those dyes as described in each of the publications of JP-A Nos. 10-130557 9-255906, 7-97541, and 6-234944, EP No. 982371A1, JP-A Nos. 2002-302619, 2002-327131, and 2002-265809, JW-A Nos. 2000-43450, 2000-43451, 2000-43452, 2000-43453, 2003-106572, 2003-104332, 2003-238862, and 2004-83609 can also be used preferably as the long wavelength dye L.

The black ink composition of the invention contains, the long wavelength dye L in the ink preferably, from 0.2 to 30 mass %, particularly preferably, from 0.5 to 15 mass % and, most preferably, from 1 to 10 mass %.

The ratio between the short wavelength dye S and the long wavelength dye L of the invention, is preferably, from 1 to 50 mass %, more preferably, 5 to 40 mass % and, most preferably, from 10 to 30 mass % of the short wavelength dye S relative to the long wavelength dye L.

Black Ink Composition

The black ink composition of the invention means an ink composition containing at least a short wavelength dye and a long wavelength dye L. The ink of the invention can be incorporated with a medium and, in a case of using a solvent as the medium, it is particularly suitable as an ink for use in ink jet recording.

The black ink composition of the invention can be prepared by using an oleophilic medium or an aqueous medium as a medium and dissolving and/or dispersing the dye of the invention therein. It is preferred to use the aqueous medium.

As the aqueous medium, a mixture comprising water as a main ingredient and optionally adding a water miscible organic solvent can be used. As examples of the water miscible organic solvent, those described in JP-A No. 2003-306623 can be used.

The water miscible organic solvents may be used by two or more kinds in combination. The black ink composition of the invention also includes the ink composition excluding the medium.

Compositional ingredients of the black ink composition of the invention are to be described specifically, and the information for the composition can be used correspondingly also for ink compositions of other colors in a case of preparing the ink set containing the black ink composition of the invention.

Examples of the compound applicable to the invention are described, in addition, also in Japanese Patent Application Nos. 2001-96610, 2001-24352, 2001-47013, 2001-57063, 2001-76689, 2001-193638, 2001-15614, 2001-110457, and 2001-110335 with no restriction to them. Further, each of the compounds described above can be synthesized easily by the method described in the patent documents referred to herein.

Ink for Use in Ink Jet Recording

The ink set for use in ink jet recording of the invention comprises a yellow ink containing at least one yellow dye, a magenta ink containing at least one magenta dye, a cyan ink containing at least one cyan dye, and a black in containing at least one black dye as the minimum constituent element. As the dye contained in each of the inks, various dyes described above are used.

Usually, each of the inks can be prepared by dissolving and/or dispersing the dye in an oleophilic medium or an aqueous medium. Use of the aqueous medium is preferred.

Other additives can be added optionally within a range not deteriorating the effect of the invention. Other additives include, for example, known additives such as drying inhibitor (moistening agent), discoloration inhibitor, emulsion stabilizer, penetration promotor, UV-ray absorber, corrosion inhibitor, anti-mold agent, pH controller, surface tension controller, defoamer, viscosity controller, dispersant, dispersion stabilizer, anti-rusting agent and chelating agent. Various kinds of the additives described above are added directly to the ink liquid in a case of the water soluble ink. In a case of using an oil soluble dye in the form of a dispersion, they are generally added to the dispersion after preparation of the dye dispersion but they may be added upon preparation to the oil phase or the aqueous phase.

The drying inhibitor is used preferably with an aim of preventing clogging due to drying of the ink for use in ink jet at an ink jetting port used in an ink jet recording system.

The drying inhibitor is preferably a water soluble organic solvent having a vapor pressure lower than that of water. Specific examples include polyhydric alcohols typically represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerine, and trimethylol propane, lower alkyl ethers of polyhydric alcohols such as ethylene glycol monomethyl(or ethyl)ether, diethylene glycol monomethyl (or ethyl)ether, and polyethylene glycol monoethyl (or butyl) ether, heterocyclic rings such as 2-pyrrolidone, N-methyl-2-pyrrolidone, 1,3-dimethyl-2-imidazolidinone, and N-ethyl morpholine, sulfur-containing compounds such as sulfolane, dimethyl sulfoxide, and 3-sulfolene, poly-functional compounds such as diacetone alcohol and diethanol amine, and urea derivatives. Among them, polyhydric alcohols such as glycerine and diethylene glycol are more preferred. The drying inhibitors can be used each alone or two or more of them may be used in combination. The drying inhibitor is preferably contained by 10 to 50% by weight in the ink.

The permeation promotor is used preferably with an aim of effectively permeating the ink for use in ink jet to paper. As the permeation promotor, alcohols such as ethanol, isopropanol, butanol, di(tri)ethylene glycol monobutyl ether, and 1,2-hexanediol and nonionic surfactants such as sodium lauryl sulfate and sodium oleate can be used. They are usually provide a sufficient effect when incorporated by 5 to 30% by weight in the ink and are used preferably within a range of the addition amount not causing blur of printing and print-through.

The UV-ray absorber is used with an aim of improving the storability of images. As the UV-ray absorber, benzotriazole compounds described, for example, in JP-A Nos. 58-185677, 61-190537, 2-782, 5-197075, and 9-34057, benzophenone compounds described, for example, in JP-A Nos. 46-2784, and 5-194483, and U.S. Pat. No. 3,214,463, succinic acid compounds described, for example, in JP-B Nos. 48-30492 and 56-21141, and JP-A No. 10-88106, triazine compounds disclosed, for example in JP-A Nos. 4-289503, 8-53427, 8-239368, 10-18261, and JW-A 8-501291, compounds described in Research Disclosure No. 24239, those compounds that absorb UV-rays to emit fluorescence typically represented by stilbene and oxazole compounds, that is, so-called fluorescence whiteners can also be used.

The discoloration inhibitor is used with an aim of improving the storability of images. As the discoloration inhibitor, various kinds of organic and metal complex type discoloration inhibitors can be used. The organic discoloration inhibitor include, for example, hydroquinones, alkoxyphenols, dialkoxyphenols, phenols, anilines, amines, indanes, chromans, alkoxyanilines, and heterocylic rings, and the metal complex includes nickel complex, zinc complex, etc. More specifically, compounds described in Patent Documents cited in Research Disclosure No. 17643, vol. VII-I to J, No. 15162, No. 18716, page 650, left column, No. 36544, page 527, No. 307105, page 872, and No. 15162 and compounds included in the general formula of typical compound and examples of the compounds described in JP-A No. 62-215272, pp 127 to 137 can be used.

The anti-mold agent includes, for example, sodium dihydro acetate, sodium benzoate, sodium pyridinethion-1-oxide, ethyl p-hydroxy benzoate ester, 1,2-benzoixothiazolin-3-one and salts thereof. They are preferably used by from 0.02 to 1.00% by weight in the ink.

As the pH controller, the neutralizing agent (organic base or inorganic alkali) can be used. The pH controller is added with an aim of improving the store stability of the ink for use in ink jet so as to control the pH of the ink for use in ink jet to 6 to 10 and, more preferably, 7 to 10.

The surface tension controller includes cationic or anionic surfactant. The surface tension of the ink for use in ink jet according to the invention is preferably from 25 to 70 mN/n. It is further preferably from 25 to 60 mN/m. Further, the viscosity of the ink for use in ink jet according to the invention is preferably 30 mPa·s or less. More preferably, it is controlled to 20 mPa·s or less. Examples of the surfactant are preferably anionic surfactant such as fatty acid salts, alkyl sulfate ester salts, alkylbenzene sulfonate salts, alkylnaphthalene sulfonate salts, dialkylsulfosuccinate salts, alkylphosphate ester salts, naphthalene sulfonic acid formalin condensate, and polyoxyethylene alkyl sulfate ester salts, and nonionic surfactant such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkylamine, glycerine fatty acid ester, and oxyethylene oxypropylene block copolymer. Further, SURFYNOLS (manufactured by Air Products & Chemicals Co.) as the acetylene type polyoxyethylene oxide surfactant is also used preferably. Further, amino oxide type amphoteric surfactant such as N,N-dimethyl-N-alkylamine oxide is also preferred. Further, those referred to as surfactants described in JP-A No. 59-157630, pp (37) to (38), and Research Disclosure No. 308119 (1989) can also be used.

As the defoamer, fluoro type and silicone type compounds or chelating agents typically represented by EDTA may also be used optionally.

As a method of dispersing the dye according to the invention, in a case where it is oil soluble, into an aqueous medium, it is preferred to disperse fine pigmented particles containing a dye and an oil soluble polymer into an aqueous solution as described in JP-A Nos. 11-286637, 2001-240763, 2001-262039, and 2001-247788, or disperse the dye of the invention dissolved in a high boiling organic solvent into an aqueous medium as described in JP-A Nos. 2001-262018, 2001-240763, and 2001-335734, and Japanese Patent Application No. 2000-203857. As the specific method, the oil soluble polymer, the high boiling organic solvent and additives to be used, as well as the amount thereof to be used in a case of dispersing the dye of the invention into the aqueous medium, those described in the patent documents described above can be used preferably. Alternatively, the dye may be added in the state of a solid as it is into the state of fine particles. Upon dispersion, a dispersant or surfactant can be used. As the dispersing apparatus, a simple stirrer or impeller stirring system, inline stirring system, mill system (for example, colloid mill, ball mill, sand mill, attritor, roll mill, agitator mill, etc.), supersonic system, high pressure emulsion dispersion system (high pressure homogenizer; specific commercial apparatus including a Goulin homogenizer, micro fluidizer, DeBEE 2000, etc.) can be used. The method of preparing the ink for use in ink jet recording is described specifically also in each of the publications of JP-A Nos. 5-148436, 5-295312, 7-97541, 7-82515, 7-118584, and 11-286637, and Japanese Patent Application No. 2000-87539 in addition the patent documents described previously, which can be utilized also for the preparation of the ink for use in ink jet recording according to the invention.

As the aqueous medium, a mixture comprising water as a main ingredient and with optional addition of a water miscible organic solvent can be used. Examples of the water miscible organic solvent includes alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, 1,3-hexanediol, 1,5-pentanediol, glycerine, hexanetriol, and thiodiglycol), polyhydric alcohol alkyl ether (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monobutyl ether, triethylene glycol monoethyl ether, and ethylene glycol monophenyl ether), amines (for example, ethanolamine, diethanol amine, triethanol amine, N-methyldiethanol amine, N-ethyldiethanol amine, morpholine, N-ethylmonopholine, ethylene diamine, diethylene triamine, triethylene tetramine, polyethylene imine, tetramethyl propylene diamino) and other polar solvents (for example, formamide, N,N-dimethyl formamide, N,N-dimethyl acetoamide, dimethylsulfoxide, sulfolane, and heterocyclic ring-containing organic solvents (for example, sulfolane, 2-pyrrolidone, N-methyl-2-pyrrolidone, N-vinyl-2-pyrrolidone, 2-oxazolidone, 1,3-dimethyl-2-imidazolidinone), acetonitrile, and acetone). The water miscible organic solvents may be used by two or more kinds in combination.

The ink for use in the ink set of the invention preferably contains a dye of 0.1 parts by weight or more to 20 parts by weight or less, more preferably 0.5 parts by weight or more to 12 parts by weight or less, still more preferably 1.0 parts by weight or more to 7 parts by weight or less, each based on 100 parts by weight of the ink. Further, as each of the inks of yellow, magenta and cyan, two or more kinds of dyes may be used in combination so long as the oxidation potential is more electropositive than 0.8 V. In a case of using two or more kinds of dyes in combination, it is preferred that the total content of the dyes is within the range described above.

In recent years, each of the inks of yellow, magenta, and cyan is constituted with two or more kinds of inks of different dye concentrations and it is preferred for the dyes used in each of dense and pale inks in the invention that the oxidation potential for each of them is more electropositive than 0.8 V.

In the invention, in a case of using two or more different kinds of inks as the ink of an identical hue, it is preferred that the concentration of one kind of ink is 0.05 to 0.5 times the concentration of other ink.

Ink Jet Recording Method

In the ink jet recording method according to the invention, energy is supplied to each of inks in the ink set for use in ink jet recording and images are formed to known image receiving materials, that is, common paper, resin coated paper, exclusive ink jet paper as described, for example, in JP-A Nos. 8-169172, 8-27693, 2-276670, 7-276789, 9-323475, 62-238783, 10-153989, 10-217473, 10-235995, 10-337947, 10-217597, and 10-337947, film, paper used in common with electrophotography, cloth, glass, metal, ceramics, etc.

In a case of forming images, a polymer latex compound may be used in combination with an aim of providing gloss or water proofness, or improving the weather proofness. The timing of providing the latex compound to an image receiving material may be before, after or at the same time of providing a colorant and, accordingly, also the place of addition may be in an image receiving paper, in an ink, or it may be used as a liquid state of the polymer latex alone.

Specifically, methods described in Japanese Patent Application Nos. 2000-363090, 2000-315231, 2000-354380, 2000-343944, and 2000-268952 can be used preferably.

Description is to be made to recording paper and recording film used for ink jet printing by using the ink according to the invention. As the support in the recording paper and recording film, those comprising chemical pulp such as LBKP and NBKP, mechanical pulp such as GP, PGW, RMP, TMP, CTMP, CMP, and CGP and waste paper pulp such as DIP, mixed optionally with additives such as known pigments, binder, sizing agent, fixing agent, cationic agent, and paper strength enhancer, and manufactured by various apparatus such as a fourdrinier paper machine or cylinder paper machine can be used. In addition to the supports described above, they may be either synthesis paper or plastic film sheet, and it is preferred that the support has a thickness of from 10 to 250 μm and the basis weight of from 10 to 250 g/m$^2$. An ink receiving layer and a back coat layer may be disposed to the support as it is, or the ink receiving layer and the back coat layer may also be formed after forming size press or anchor coat layer using starch, polyvinyl alcohol, etc. Further, the support may be applied with a flattening treatment by a calendering apparatus such as a machine calender, TG calender, soft calender, etc. As the support in the invention, paper and plastic film laminated on both surfaces thereof with polyolefin (for example, polyethylene, polystyrene, polyethylene terephthalate, polybutene and copolymer thereof) are used more preferably. It is preferred to add a white pigment (for example, titanium oxide or zinc oxide) or tinting dye (for example, cobalt blue, ultramarine, or neodymium oxide) into the polyolefin.

A pigment or aqueous binder is contained in the ink receiving layer formed on the support. As the pigment, white pigment is preferred. The white pigment includes inorganic white pigments such as calcium carbonate, kaolinite, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene pigment, acrylic pigment, urea resin, and melamine resin. As the white pigment contained in the ink receiving layer, porous inorganic pigment is preferred and, particularly, synthetic amorphous silica, etc with large pore area are preferred. As the synthetic amorphous silica, either anhydrous silicic acid obtained by a dry production process or hydrous silicic acid obtained by a wet production process may also be used and, particularly, use of hydrous silicic acid is desirable.

The aqueous binder contained in the ink receiving layer includes water soluble polymers such as polyvinyl alcohol, silanol modified polyvinyl alcohol, starch, cationized starch, casein, gelatin, carboxymethyl cellulose, hydroxyethyl cellulose, polyvinyl pyrrolidone, polyalkylene oxide and polyalkylene oxide derivatives, and water dispersible polymers such as styrene butadiene latex, and acrylic emulsion. The aqueous binder may be used alone or two or more of them may be used in combination. Among them, polyvinyl alcohol and silanol modified polyvinyl alcohol are particularly preferred in the invention in view of the adhesion to the pigment and peeling resistance of the ink receiving layer.

The ink receiving layer can also contain, in addition to the pigment and the aqueous binder, a mordant, water proofing agent, light fastness improver, surfactant and other additives.

The mordant added in the ink receiving layer is preferably passivated. For this purpose, a polymer mordant is used preferably.

The polymer mordant is described in each of the specifications of JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, and 1-161236, U.S. Pat. Nos. 2,484,430, 2,548,564, 3,148,061, 3,309,690, 4,115,124, 4,124,386, 4,193,800, 4,273,853, 4,282,305, and 4,450,224. The image receiving material containing each of the mordants described in JP-A No. 1-161236, pp 212 to 215 is particularly preferred. By the use of the polymer mordant described in this publication, images of excellent picture quality can be obtained and the light fastness of the images can be improved.

The water proofing agent is effective for making images water proof. As the water proofing agent, cationic resin is particularly preferred. The cationic resin includes, for example, polyamide polyamine epychlorohydrin, polyethyleneimide, polyamine sulfone, dimethyl diallyl ammonium chloride polymer, cation polyacrylic amide, and colloidal silica and, among the cationic resins, polyamide polyamine epichlorohydrin is particularly preferred. The content of the cationic resin is, preferably, 1 to 15% by weight and, particularly preferably 3 to 10% by weight based on the entire solid content of the ink receiving layer.

The light fastness improver includes, for example, zinc sulfate, zinc oxide, hindered amine antioxidant, and benzophenone or benzotriazole UV-ray absorber. Among them, zinc sulfate is particularly preferred.

The surfactant functions as a coating aid, peeling improver, slidability improver or charge inhibitor. The surfactant is described in each of the publications of JP-A Nos. 62-173463 and 62-183457. Instead of the surfactant, an organic fluoro compound may also be used. The organic fluoro compound is preferably hydrophobic. Examples of the organic fluoro compound include fluoro surfactant, oily fluoro compound (for example, fluoro oil) and solid fluoro compound (for example, tetrafluoro ethylene resin). The organic fluoro compound is described in each of the publications of JP-B No. 57-9053 (columns 8 to 17), JP-A Nos. 61-20994 and 62-135826. Other additives to be added to the ink receiving layer include a pigment dispersant, thickener, defoamer, dye, fluorescence whitener, corrosion inhibitor, pH controller, matting agent, and film hardener. The ink receiving layer may be a single layer or two layers.

The recording taper and the recording film can also be provided with a back coat layer, and the ingredient that can be added to the layer includes a white pigment, aqueous binder and other ingredients. The white pigment contained in the back coat layer includes, for example, white inorganic pigments such as light calcium carbonate, heavy calcium carbonate, kaolinite, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, and magnesium hydroxide, and organic pigments such as styrenic plastic pigment, acrylic plastic pigment, polyethylene, microcapsule, urea resin, and melamine resin.

The aqueous binder contained in the back coat layer includes water soluble polymers such as styrene/maleic acid salt copolymer, styrene/acrylic acid salt copolymer, polyvinyl alcohol, silanol modified polyvinyl alcohol, starch, cationized starch, casein, gelatin, carboxymethyl cellulose, hydroxyethyl cellulose, and polyvinyl pyrrolidone, and water dispersible polymers such as styrene-butadiene latex, and acrylic emulsion. Other ingredients contained in the back coat layer include, for example, a defoamer, foam suppressing agent, dye, fluorescence whitener, corrosion inhibitor, and water proofing agent.

A polymer latex may also be added to the constituent layer (including back coat layer) of the ink jet recording paper and the recording film. The polymer latex is used with an aim of improving the film property such as dimension stabilization, curl inhibition, adhesion inhibition and crack inhibition of film. The polymer latex is described in each of the publications of JP-A Nos. 62-245258, 62-136648, and 62-110066. When a polymer latex with low glass transition point (40° C. or lower) is added to a layer containing a mordant agent, cracking or curling of the layer can be prevented. Further, curling can be prevented also by adding a polymer latex of high glass transition point to the back coat layer.

For the ink jet recording method of the invention, the ink jet recording system is not limited particularly and it can be used to known systems, for example, a charge control system of discharging an ink by utilizing electrostatic attraction, a drop on demand system of utilizing vibration pressure of a piezo-element (pressure pulse system), an acoustic ink jet system of converting electric signals into acoustic beams, which are irradiated to the ink and discharging the ink by utilizing the irradiation pressure, and a thermal ink jet system of forming bubbles by heating the ink and utilizing the resultant pressure. The ink jet recording system includes a system of ejecting a number of ink at low density with small volume referred to as a photo-ink, a system of improving the picture quality by using plural inks of different densities substantially at an identical hue, or a system of using a colorless transparent ink.

Method of Preventing Discoloration of Ink Jet Recording Images

The method of preventing discoloration for ink jet recording images according to the invention is practiced by ink jet recording using the ink set according to the invention described above.

The ink set for use in ink jet recording of the invention can provide images of high light fastness to gases (particularly, ozone gas) and can prevent discoloration of images since the oxidation potential for each of the yellow dye, the magenta dye and the cyan dye is more electropositive than 0.8 V (vs SCE).

EXAMPLE

The present invention is to be described by way of examples but the invention is not restricted to the examples.

Example 1

Preparation of Aqueous Ink

After adding deionized water to the following ingredients to make up to one liter, they were stirred for one hour under heating at 30 to 40° C., pH was adjusted to 9 with 10 mol/L of KOH, and they were filtered under a reduced pressure through a micro-filter with an average pore size of 0.25 μm to prepare an ink liquid for light magenta.

| | |
|---|---|
| Magenta dye shown by the following structural formula (T-1) | 7.5 g/l |
| Diethylene glycol | 150 g/l |
| Urea | 37 g/l |
| Glycerine | 130 g/l |
| Triethylene glycol monobutyl ether | 130 g/l |
| Triethanolamine | 6.9 g/l |
| Benzotriazole | 0.08 g/l |
| SURFYNOL 465 (surfactant, manufactured by Air Products Japan Co.) | 10.5 g/l |
| PROXEL XL-2 (bactericide: manufactured by ICI JAPAN) | 3.5 g/l |

Further, magenta ink, light cyan ink, yellow ink, and black ink were prepared by changing the dye species and additives to prepare an ink set 101 at the concentration shown in Table 1.

TABLE 1

| | Composition of ink set 101 | | | | | |
|---|---|---|---|---|---|---|
| | Light magenta | Magenta | Light cyan | Cyan | Yellow | Black |
| Dye (g/l) | T-1 (7.5) | T-1 (30.0) | T-1 (8.75) | T-1 (35.0) | T-1 (29.0) | T-1 (20.0) T-5 (20.0) T-6 (20.0) T-3 (21.0) |
| Diethylene glycol (g/l) | 150 | 110 | 200 | 130 | 160 | 20 |
| Urea (g/l) | 37 | 46 | — | — | — | — |
| Glycerin (g/l) | 130 | 160 | 150 | 180 | 150 | 120 |
| Triethylene glycol monobutyl ether (g/l) | 130 | 140 | 130 | 140 | 180 | — |
| Diethylene glycol monobutyl ether (g/l) | — | — | — | — | — | 230 |
| 2-pyrrolidone (g/l) | — | — | — | — | — | 81 |
| SURFYNOL 465 (g/l) | 10.5 | 10 | 9.8 | 10.5 | — | — |
| SURFYNOL STG (g/l) | — | — | — | — | 8.5 | 9.8 |
| Triethanolamine (g/l) | 6.9 | 7 | 6 | 6.3 | 0.9 | 17.9 |
| Benzotriazole (g/l) | 0.08 | 0.07 | 0.08 | 0.08 | 0.06 | 0.06 |
| Proxel XL2 (g/l) | 3.5 | 1.5 | 1.1 | 1.2 | 1.5 | 1.1 |

(T-1)

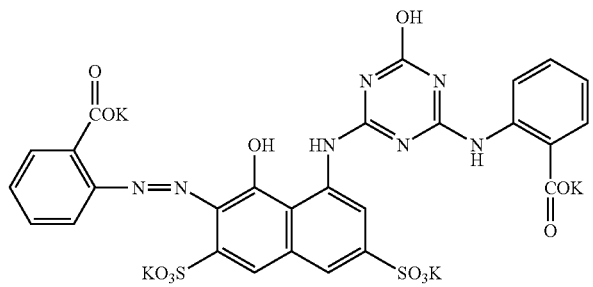

(0.61)

(T-2)

TABLE 1-continued

Composition of ink set 101

| Light magenta | Magenta | Light cyan | Cyan | Yellow | Black |
|---|---|---|---|---|---|

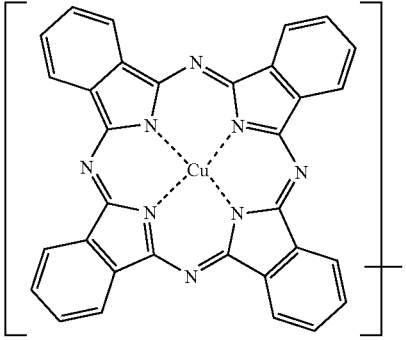

(0.75)     (T-3)

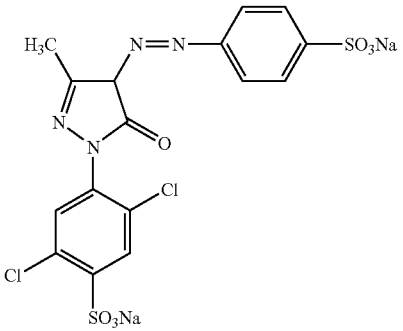

(0.99)     (T-4)

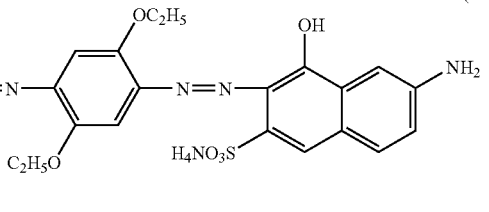

(T-5)

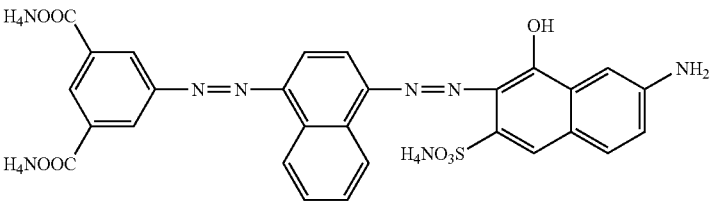

(T-6)

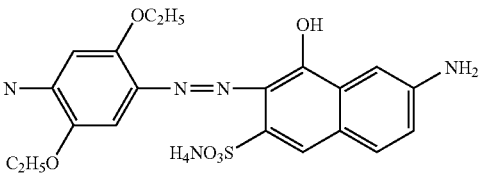

Then, ink sets 102 to 113 were prepared by changing the dye species for each of the inks of light magenta, magenta, light cyan, cyan, yellow and black of the ink set 101 in accordance with Table 2. In a case of charging the dyes, the dye concentration was adjusted such that the transmission concentration for each of the ink solutions was equal with that for the ink set 101 on the basis of use by replacing them by every equimolar amount. And when using a plurality of dyes, each of the plurality of dyes is used in an equal amount each other. Since the black ink in the invention uses at least the water soluble short wavelength dye S and the water soluble long wavelength dye L, the amount of use of each dye (g/l) was indicated by numerical values in each parenthesis.

TABLE 2

| Ink set | Light magenta | Magenta | Light cyan | Cyan | Yellow | Black | Remarks |
|---|---|---|---|---|---|---|---|
| 101 | T-1 | T-1 | T-2 | T-2 | T-3 | T-4, T-5 T-6, T-3 | Comparison |
| 102 | T-1 | T-1 | C-11 | C-11 | T-3 | T-4, T-5 T-6, T-3 | Comparison |
| 103 | M-10 | M-10 | T-2 | T-2 | T-3 | T-4, T-5 T-6, T-3 | Comparison |
| 104 | M-3 | M-3 | C-11 | C-11 | T-3 | T-4, T-5 T-6, T-3 | Comparison |
| 105 | M-3 | M-3 | C-11 | C-11 | T-3 | S-1 (15.0) L-1 (60.0) | Invention |
| 106 | M-6 | M-3 | C-12 | C-11 | Y-2 | S-1 (15.0) L-1 (60.0) | Invention |
| 107 | M-10 | M-10 | C-40 | C-40 | Y-4 | S-1 (15.0) L-2 (60.0) | Invention |

TABLE 2-continued

| Ink set | Light magenta | Magenta | Light cyan | Cyan | Yellow | Black | Remarks |
|---|---|---|---|---|---|---|---|
| 108 | M-15 | M-10 | C-11 | C-11 | Y-4 | S-1 (15.0) L-2 (60.0) | Invention |
| 109 | M-16 | M-16 | C-45 | C-45 | Y-5 | S-1 (15.0) L-3 (60.0) | Invention |
| 110 | M-12 | M-10 | C-42 | C-11 | Y-5 | S-2 (20.0) L-4 (60.0) | Invention |
| 111 | M-17 | M-17 | C-40 | C-11 | Y-10 | S-3 (15.0) L-5 (60.0) | Invention |
| 112 | M-18 | M-18 | C42 | C-40 | Y-28 | S-1 (15.0) L-6 (60.0) | Invention |
| 113 | M-10 | M-10 | C-11 | C-11 | Y-24 Y-25 | S-1 (15.0) L-1 (55.0) C-11 (3.0) | Invention |

Absorption spectrum in water of compounds of short wavelength dyes S-1, S-2 Used as complementary color dye to long wavelength dye L: λmax=472 nm, half-value width=130 nm.

Absorption spectrum in water of long wavelength dye L-2: λmax=578 nm, half-value width=130 nm

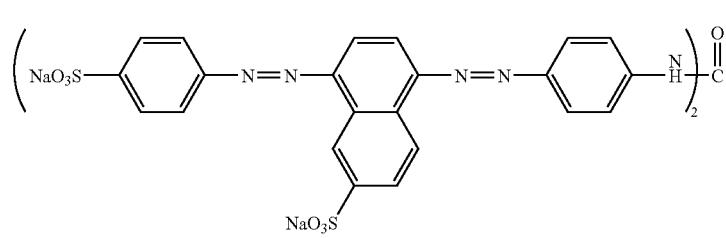

S-1

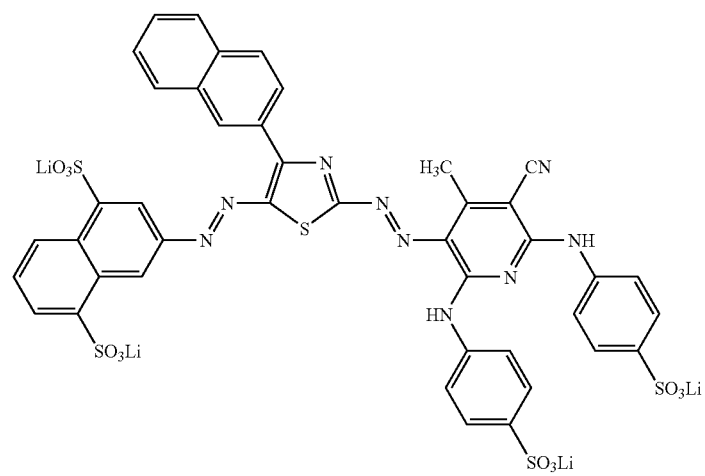

L-1

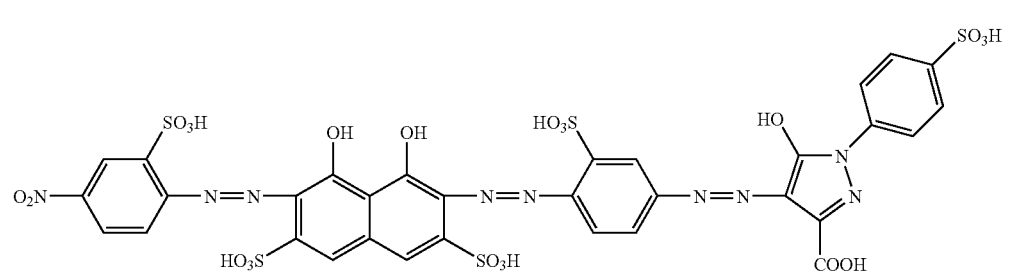

L-2

-continued
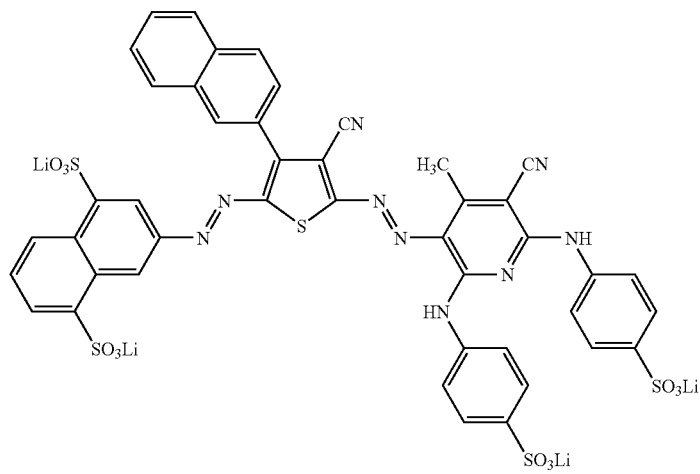
L-3
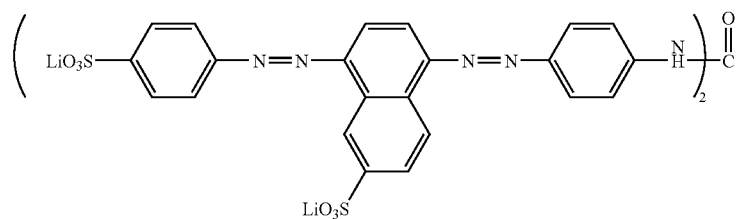
S-2
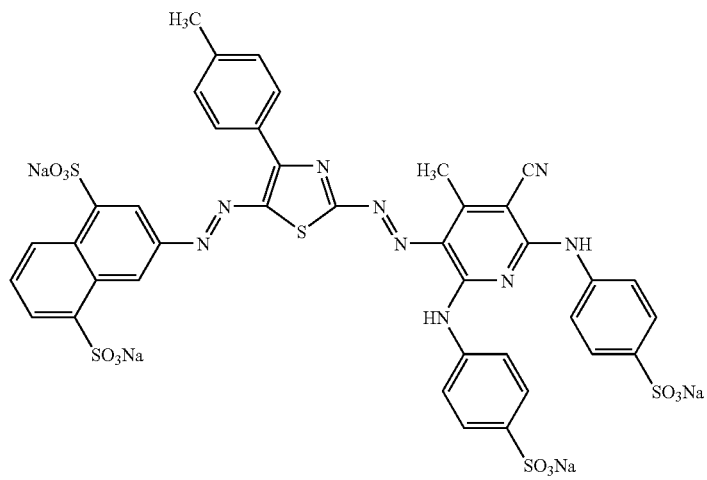
L-4
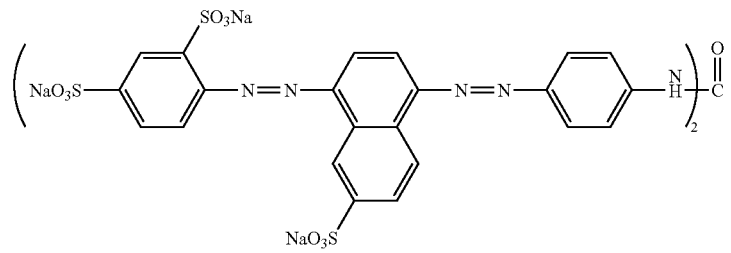
S-3

-continued

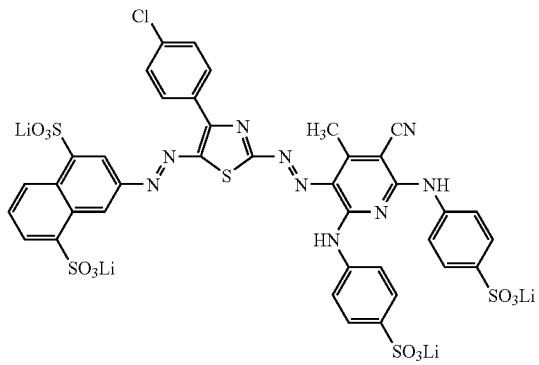
L-5

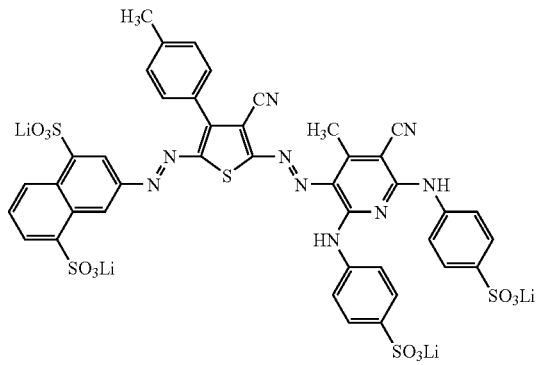
L-6

Image Recording and Evaluation

Ink sets 101 to 112 were packed each in a cartridge of an ink jet printer PM-G800 (manufactured by Seiko Epson Co.) and images were printed by using the printer onto photographic ink jet paper (gloss) manufactured by Seiko Epson Co. and the following evaluation was conducted.

Printing Performance (1) After setting the cartridge to the printer and confirming the ejection of the ink from all the nozzles, output was conducted to 50 sheets of A4-size paper and disturbance in the printing was evaluated.

A: with no disturbance of printing from the start to the end of printing

B: output with disturbance occurred in printing

C: disturbance occurred from the start to the end of printing

Printing Performance (2) After leaving the cartridge at 60° C. for ten days, disturbance in the printing was evaluated in the same method as for the printing performance.

Drying Property

Stains upon finger touch was evaluated with naked eyes just after printing.

A: with no stains

Blur for Fine Lines (1) Fine patterns of yellow, magenta, cyan and black were printed and evaluated with naked eyes.

(2) For black, after printing the magenta ink in a solid pattern, fine black lines were printed and blur due to contact between colors was also evaluated.

A: with no blur for fine lines

Water Proofness

After immersing resultant images for 5 sec in deionized water, blur of images was evaluated with naked eyes.

A: with no blur of images

Image Fastness

For image fastness, gray A comprising three primary colors, gray B consisting only of a black ink and gray C comprising three primary colors+black ink were prepared as gray printing samples and the following evaluation was conducted.

1. Light Fastness: Described as "Light Resistance" in the Following Table

After measuring the chromaticity (a*1, b*1) and lightness (L1) just after printing by SPM100-II manufactured by Gretagu Co., xenon light (85,000 lux) was irradiated by using a weatherometer manufactured by Atlas Co. for seven days and then the chromaticity (a*2, b*2), luminocity (L2) were measured again, and color difference before and after light irradiation (ΔE) was determined in accordance the following equation (I) to conduct evaluation.

$$\Delta E = \{(a*1-a*2)^2+(b*1-b*2)^2+(L1-L2)^2\}^{1/2} \qquad \text{equation (I)}$$

The color difference was evaluated at three points for the reflection density of 1.0, 1.3, and 1.6, and evaluated as A in a case where the color difference was less than 5 at any density, as B in a case of including both evaluations of less than 5 and 5 or more depending on the density, and as C in a case where the color difference was 5 or more at all density.

2. Heat Fastness: Described as "Heat Resistance" in the Following Table

Color difference before and after storing specimens under the conditions at 80° C. for 6 days was evaluated by the same method as that for the light fastness.

The dye residual ratio was evaluated at three points for the reflection density of 1.0, 1.3, and 1.6, and evaluated as A in a case where the color difference was less than 3 at any density, as B in a case of including both evaluations of less than 3 and 3 or more depending on the density, and as C in a case where the color difference was 3 or more at all density.

3. Ozone Resistance

The color difference before and after storing the sample for seven days in a box where the ozone gas concentration was set to 0.5 ppm was evaluated by the same method as that for the light fastness.

The dye residual ratio was evaluated at three points for the reflection density of 1.0, 1.3, and 1.6, and evaluated as A in a case where the color difference was less than 10 at any density, as B in a case of including both evaluations of less than 10 and 10 or more depending on the density, and as C in a case where the color difference was 10 or more at all density. The ozone gas concentration in the box was set by using an ozone gas monitor manufactured by APPLICS (model; OZG-EM-01). The results for all evaluations in Example 1 described above are shown in the following Table 3.

TABLE 3

| Ink set | Printing performance (1) | Printing performance (2) | Drying property | Blur for fine line (1) | Blur for fine line (2) | Water proofness | Image fastness | | | | | | | | |
|---|---|---|---|---|---|---|---|---|---|---|---|---|---|---|---|
| | | | | | | | Light resistance | | | Heat resistance | | | Ozone resistance | | |
| | | | | | | | Gray A | Gray B | Gray C | Gray A | Gray B | Gray C | Gray A | Gray B | Gray C |
| 101 (Comparison) | A | A | A | A | A | A | C | C | C | C | B | C | C | C | C |
| 102 (Comparison) | A | A | A | A | A | A | C | C | C | C | B | C | C | C | C |
| 103 (Comparison) | A | A | A | A | A | A | B | C | C | C | B | C | C | C | C |
| 104 (Comparison) | A | A | A | A | A | A | B | C | C | A | B | B | A | C | C |
| 105 (Invention) | A | A | A | A | A | A | A | A | A | A | A | A | A | A | A |
| 106 (Invention) | A | A | A | A | A | A | A | A | A | A | A | A | A | A | A |
| 107 (Invention) | A | A | A | A | A | A | A | A | A | A | A | A | A | A | A |
| 108 (Invention) | A | A | A | A | A | A | A | A | A | A | A | A | A | A | A |
| 109 (Invention) | A | A | A | A | A | A | A | A | A | A | A | A | A | A | A |
| 110 (Invention) | A | A | A | A | A | A | A | A | A | A | A | A | A | A | A |
| 111 (Invention) | A | A | A | A | A | A | A | A | A | A | A | A | A | A | A |
| 112 (Invention) | A | A | A | A | A | A | A | A | A | A | A | A | A | A | A |
| 113 (Invention) | A | A | A | A | A | A | A | A | A | A | A | A | A | A | A |

In a case of using the ink composition according to the invention it can be seen that particularly excellent performance is shown for the image fastness. Further, the ink composition according to the invention can provide excellent ejection stability with no clogging, is excellent in the performance upon outputting fine lines with no blur and also excellent in the water proofness. Also in a case of replacing the image receiving paper used in the invention with photographically finished ink jet paper GASAI manufactured by Fuji Photo Film Co. Ltd. and PP101 manufactured by Canon Co., the same effects as described above can also be observed.

Example 2

When the same ink as prepared in Example 1 was packed in an ink jet printer PIXUS 990i (manufactured by Canon Co.), images were printed by the printer on the photographically finished ink jet paper GASAI manufactured by Fuji Photo Film Co., Ltd. and the same evaluation was conducted as in Example 1, the same effects as those in Example 1 were obtained. Similar effects were also observed in a case where the image receiving paper was photographic paper (gloss) manufactured by Epson Co and PR101 manufactured by Canon Inc.

As demonstrated in the examples, the ink jet recording solution according to the invention shows favorable fastness, particularly, light fastness and ozone fastness as an ink for use in ink jet recording and is also excellent in ejection stability, water proofness and in view of blur.

INDUSTRIAL APPLICABILITY

According to the ink set for use in ink jet recording of the invention, gas (particularly, ozone gas) discoloration is suppressed and the light fastness is excellent, furthermore the ejection stability is also excellent. According to the ink jet recording method using the ink set, images excellent in gas fastness, water proofness and blur, and with high light fastness can be formed. Further, according to the ink jet recording method of the invention, discoloration of images can be prevented effectively by using the ink set.

The entire disclosure of each and every foreign patent application from which the benefit of foreign priority has been claimed in the present application is incorporated herein by reference, as if fully set forth.

The invention claimed is:

1. An ink set comprising:
   a yellow ink;
   a magenta ink;
   a cyan ink; and
   a black ink, in which at least one of the inks is an ink containing at least one dye in an aqueous medium,
   wherein each of the yellow ink, the magenta ink and the cyan ink is an ink containing at least one dye having an oxidation potential of more electropositive than 0.8 V (vs Saturated Calomel Electrode), and the black ink contains: a water soluble long wavelength dye L; and a water soluble short wavelength dye S that has three or more azo groups in one molecule and a naphthalene skeleton.

2. An ink set comprising:
   a yellow ink;
   a magenta ink;
   a cyan ink; and
   a black ink, in which at least one of the inks is an ink containing at least one dye in an aqueous medium,
   wherein each of the yellow ink, the magenta ink and the cyan ink is an azo dye containing at least one heterocyclic ring in a molecule or a phthalocyanine dye containing at least one heterocyclic ring in a molecule, and the black ink contains: a water soluble long wavelength dye L; and a water soluble short wavelength dye S that has three or more azo groups in one molecule and a naphthalene skeleton.

3. The ink set according to claim 1,
wherein the water soluble long wavelength dye L has a maximum absorption spectrum of 550 to 700 nm and a half-value width of 100 nm or more in an aqueous medium, and the water soluble short wavelength dye S has a maximum absorption spectrum of 440 to 540 nm and a half-value width of 90 to 200 nm in an aqueous medium.

4. The ink set according to claim 1,
wherein the water soluble short wavelength dye S has 3 to 6 azo groups in one molecule and does not have a phenolic hydroxyl group.

5. The ink set according to claim 1,
wherein the water soluble short wavelength dye S contains C.I. Direct Red 84.

6. The ink set according to claim 1,
wherein the black ink contains the water soluble short wavelength dye S in an amount of from 0.1 to 4 mass %.

7. The ink set according to claim 1,
wherein the water soluble long wavelength dye L has 2 to 4 azo groups conjugated to each other in one molecule.

8. The ink set according to claim 1,
wherein the water soluble long wavelength dye L has a hydroxyl group at a conjugation position of the azo group.

9. The ink set according to claim 1,
wherein the water soluble long wavelength dye L has one or less heterocyclic ring in a color forming group.

10. The ink set according to claim 1,
wherein the water soluble long wavelength dye L has an associative property.

11. The ink set according to claim 1,
wherein the aqueous medium has a vapor pressure of 2000 Pa or less.

12. The ink set according to claim 1,
wherein the aqueous medium is one or more member selected from the group consisting of alcohol compound, heterocyclic ring-containing organic solvent and alkyl ether of polyhydric alcohol.

13. The ink set according to claim 1, which contains one or more aqueous media selected from the group consisting of diethylene glycol, triethylene glycol, glycerine, triethylene glycol monobutyl ether, 1,5-pentanediol, 1,2-hexanediol, isopropanol, triethanolamine and 2-pyrrolidone.

14. The ink set according to claim 1,
wherein at least one of the inks contains a surfactant.

15. The ink set according to claim 1,
wherein at least one of the inks contains a corrosion inhibitor.

16. The ink set according to claim 1,
wherein at least one of the inks has a viscosity of from 1 to 20 mPa·sec.

17. The ink set according to claim 1,
wherein at least one of the inks has a surface tension of from 20 to 50 mN/m.

18. The ink set according to claim 1,
wherein at least one of the inks has a pH of from 7 to 9.

19. An ink jet recording method, which comprises forming an image on an image receiving material having an ink receiving layer containing white pigment particles on a support by utilizing an ink set according to claim 1.

* * * * *